United States Patent
Sindhu et al.

(10) Patent No.: US 8,804,709 B2
(45) Date of Patent: Aug. 12, 2014

(54) SWITCHING DEVICE

(75) Inventors: Pradeep S. Sindhu, Mountain View, CA (US); Philippe G. Lacroute, Sunnyvale, CA (US); Matthew A. Tucker, San Francisco, CA (US); John D. Weisbloom, San Jose, CA (US); David B. Winters, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 143 days.

(21) Appl. No.: 13/416,645

(22) Filed: Mar. 9, 2012

(65) Prior Publication Data

US 2012/0163375 A1 Jun. 28, 2012

Related U.S. Application Data

(63) Continuation of application No. 11/972,327, filed on Jan. 10, 2008, now Pat. No. 8,165,145, which is a continuation of application No. 11/458,803, filed on Jul. 20, 2006, now Pat. No. 7,342,887, which is a continuation of application No. 09/448,124, filed on Nov. 24, 1999, now Pat. No. 7,102,999.

(51) Int. Cl.
*H04L 12/28* (2006.01)
*H04Q 3/545* (2006.01)
*H04J 1/16* (2006.01)
*H04L 12/56* (2006.01)

(52) U.S. Cl.
CPC .............. *H04L 49/45* (2013.01); *H04L 49/506* (2013.01); *H04L 49/3072* (2013.01); *H04L 49/1523* (2013.01); *H04Q 3/54591* (2013.01)

USPC .......... 370/369; 370/235; 370/282; 370/389; 370/359

(58) Field of Classification Search
CPC .................................... H04L 49/1523
USPC .................. 370/235, 282, 389, 359, 369
See application file for complete search history.

(56) References Cited

U.S. PATENT DOCUMENTS

| 5,042,029 A | 8/1991 | Hayakawa |
| 5,157,654 A | 10/1992 | Cisneros |
| 5,267,235 A | 11/1993 | Thacker |
| 5,418,967 A | 5/1995 | Simcoe et al. |

(Continued)

OTHER PUBLICATIONS

Co-pending U.S. Appl. No. 11/972,327, filed Jan. 10, 2008 entitled "Switching Device" by Pradeep S. Sindhu et al., 76 pages.

(Continued)

*Primary Examiner* — John Pezzlo
(74) *Attorney, Agent, or Firm* — Harrity & Harrity, LLP

(57) ABSTRACT

A switching device in a network system for transferring data includes one or more source line cards, one or more destination line cards and a switching fabric coupled to the source line cards and the destination line cards to enable data communication between any source line card and destination line card. Each source line card includes a request generator to generate a request signal to be transmitted in order to obtain an authorization to transmit data. Each destination line card includes a grant generator to generate and send back a grant signal to the source line card in response to the request signal received at the destination line card to authorize the source line card to transmit a data cell to the destination line card.

20 Claims, 20 Drawing Sheets

(56) References Cited

U.S. PATENT DOCUMENTS

| | | | |
|---|---|---|---|
| 5,463,486 | A | 10/1995 | Stevens |
| 5,463,624 | A | 10/1995 | Hogg et al. |
| 5,555,244 | A | 9/1996 | Gupta et al. |
| 5,623,688 | A | 4/1997 | Ikeda et al. |
| 5,649,217 | A | 7/1997 | Yamanaka et al. |
| 5,768,257 | A | 6/1998 | Khacherian et al. |
| 5,903,772 | A | 5/1999 | White et al. |
| 6,091,707 | A | 7/2000 | Egbert et al. |
| 6,125,112 | A | 9/2000 | Koning et al. |
| 6,160,808 | A | 12/2000 | Maurya |
| 6,185,221 | B1 | 2/2001 | Aybay |
| 6,335,932 | B2 | 1/2002 | Kadambi et al. |
| 6,351,466 | B1 * | 2/2002 | Prabhakar et al. ............ 370/413 |
| 6,430,181 | B1 | 8/2002 | Tuckey |
| 6,449,283 | B1 * | 9/2002 | Chao et al. ................... 370/461 |
| 6,493,347 | B2 | 12/2002 | Sindhu et al. |
| 6,647,019 | B1 | 11/2003 | McKeown et al. |
| 6,876,660 | B1 * | 4/2005 | Hughes et al. ............. 370/395.4 |
| 7,102,999 | B1 | 9/2006 | Sindhu et al. |
| 7,116,660 | B2 | 10/2006 | Sindhu et al. |
| 7,342,887 | B1 | 3/2008 | Sindhu et al. |
| 2003/0174701 | A1 | 9/2003 | Angle et al. |
| 2006/0013207 | A1 * | 1/2006 | McMillen et al. ............ 370/388 |
| 2008/0130655 | A1 | 6/2008 | Herbst |
| 2009/0323707 | A1 | 12/2009 | Aimoto |
| 2013/0013901 | A1 * | 1/2013 | Hansen et al. ................ 712/222 |

OTHER PUBLICATIONS

V.E. Benes, *On Rearrangeable Three-Stage Connecting Networks*, The Bell System Technical Journal, vol. XLI, No. 5, Sep. 1962, pp. 117-125.

* cited by examiner

SWITCHING DEVICE

RELATED APPLICATIONS

This application is a continuation of U.S. patent application Ser. No. 11/972,327, filed Jan. 10, 2008, which is a continuation of U.S. patent application Ser. No. 11/458,803, filed Jul. 20, 2006 (now U.S. Pat. No. 7,342,887), which is a continuation of U.S. patent application Ser. No. 09/448,124, filed Nov. 24, 1999 (now U.S. Pat. No. 7,102,999). All three applications are incorporated herein by reference.

BACKGROUND

The present invention relates generally to data routing systems, and more particularly to a method and apparatus for routing packets through a network.

In a packet switched network, a router is a switching device that receives a packet on an input line card and switches it to an output line card. Routers perform this switching function by evaluating header information at the beginning of the packet in order to determine the proper output line card for that packet. A line card can include both input ports and output ports. That is, each line card can be configured to both transmit and receive packets.

Packet traffic received by a router in the middle of a network has no predictable patterns. Packets can flow from any input line card to any output line card. Given this chaotic behavior, routers can experience instantaneous congestion at their output line cards independent of their internal design.

As a consequence, routers include buffering to handle this instantaneous contention. Contention occurs when the router receives more packets addressed to an output line card than the output line card can handle. Typically, the minimum amount of buffering is equal to the minimum end-to-end network delay multiplied by the aggregate bandwidth of the router.

A key problem in designing routers is to make them scale to a large aggregate bandwidth. There are two ways to ways to do this, increasing the speed of individual line cards and increasing the number of line cards. Technology places hard limits on the speed of individual line cards, so the only way scale throughout is to increase the number of line cards.

Two conventional approaches to designing a router include a central memory approach and a central switch approach. In the central memory approach, all of the buffering for the router is provided by a single logically-centralized memory buffer with little or none provided by the individual line cards. In the central switch approach, input and output line cards are coupled by a switch fabric where each line card provides delay-bandwidth buffering. The switch fabric typically includes no buffering. The central memory approach is lower cost, but the central switch approach is easier to scale to greater numbers of line cards.

In the central switch approach, the problem of building a scalable router reduces to a problem of building a scalable switch fabric. A conventional router built in accordance with the central switch approach is shown in FIG. 1 and includes a control path 10 and a data path 12. The router includes a switch fabric 24 controlled by a centralized controller 22. Each of the input line cards 26 send requests for bandwidth to centralized controller 22 and each of the output line cards 28 indicates the availability of bandwidth (the control path). The centralized controller 22 operates to match the requests and availability in a way that is non-blocking and fair. A switch fabric is non-blocking if two streams of packets that start and end at different line cards do not interfere with each other inside of the switch fabric. A switch fabric is fair if two or more streams of packets converging on a single output line card are given an equal share of the output line card's bandwidth by the switch fabric. Depending on the decisions made by the centralized controller 22, packets are transferred from the input line cards through the switch fabric to the output line cards (the data path).

A centralized controller works well for a relatively small router, however it rapidly becomes unimplemenbable with increases in the number of line cards. The storage and processing requirements of the central controller grow at least as the square of the number of line cards, making this approach of limited utility in scaling routers to a large size.

SUMMARY OF THE INVENTION

In general, in one aspect, the invention provides a switching device for transferring data and includes one or more source line cards each including a request generator to generate a request signal to be transmitted in order to obtain an authorization to transmit data. The switching device includes one or more destination line cards each including a grant generator to generate and send back a grant signal to a source line card in response to the request signal received at the destination line card to authorize the source line card to transmit a data cell to the destination line card. The switching device includes a switching fabric coupled to the source line card and the destination line card. The switching fabric is configured to receive and transmit the request, grant and data cell to the appropriate line cards.

Aspects of the invention can include one or more of the following features. The source line card can include a data cell transmitter that is configured to transmit the data cell upon receiving a grant signal from the destination line card. The source line card can include transmit logic that is configured to receive a request signal and a data cell on each cell slot from the request generator. The request signal and data cell can be unrelated to each other. The source line card can include a data cell transmitter that is configured to transmit the request signal and the data cell together to the switching fabric.

The switching fabric can include a plurality of planes. Each plane can be coupled to the source line card and the destination line card to receive and switch the request signal, the grant signal and the data cell to the appropriate line card. The switching fabric can include a plurality of first stage crossbars. Each first stage crossbar can have a plurality of input ports and a plurality of output ports, wherein each of the input ports of the first stage crossbar are connected to a different source line card. The switching fabric can include a plurality of second stage crossbars, each second stage crossbar having a plurality of input ports and a plurality of output ports, wherein an ith output port of the kth first stage crossbar is connected to a kth input port of the ith second stage crossbar The switching fabric can include a plurality of third stage crossbars, each third stage crossbar having a plurality of input ports and a plurality of output ports, wherein an ith output port of the kth second stage crossbar is connected to a kth input port of the ith third stage crossbar, and wherein each of the output ports of the third stage crossbars are connected to a different destination line card.

Each of the first, second and third stage crossbars can include a plurality of request spray engines. Each request spray engine can be associated with one of the input ports of the stage crossbars. Each request spray engine can receive the request signal and spray the request signal to any one of the output ports in the same crossbar to which the request spray engine is associated.

Each of the request spray engines in the first stage crossbars can include a pointer array having a plurality of pointers. Each pointer can correspond to one of the output ports and point to one of the second stage crossbars to where the request signal received is to be transferred. A jump table having a plurality of pointers to the destination line cards in a predetermined order can be included. Control logic can be included. The control logic is configurable to receive the request signal, select the correct pointer in the pointer array to determine which one of the second stage crossbars to transfer the request signal, and to replace the selected pointer with a new pointer by indexing the jump table.

Each of the first, second and third stage crossbars can further include a plurality of grant spray engines. Each grant spray engine can be associated with one of the input ports of the stage crossbars and be configured to receive the grant signal and spray the grant signal to one of the output ports in the same crossbar to which the request spray engine is associated. The crossbars can include a plurality of data cell spray engines. Each data cell spray engine can be associated with one of input ports of the stage crossbars and be configured to receive the data cell and spray the data cell to one of the output ports in the same crossbar to which the data cell spray engine is associated.

Each of the first, second and third stage crossbars can include a plurality of request handlers. Each request handler can be associated with one of output ports of the stage crossbars and be configured to receive the request signal sprayed by any one of the request spray engines in the same crossbar to which the request handler is associated.

Each of the request handlers in the first stage crossbars can include a counter array having a plurality of rows of counters and a plurality of columns of counters. The counter array is configurable to maintain a count of the request signals received at the output port associated with the counter array requiring transmission to one of the second stage crossbars. The counter array can have a plurality of counters with a nonzero count to indicate there are a plurality of request signals waiting to be transmitted. A counter controller can be included and configured to increment the counters in the counter array corresponding to the request signals received, and to decrement the counters when they are reconstructed into the request signals to be transmitted to the second stage crossbar An arbiter can be included to select the counters and to reconstruct them into the request signals for transmission to the second stage crossbar Output logic can be included to reconstruct the counters selected by the arbiter into the request signals for transmission to the second stage crossbar The request handler can include first summary bits having a plurality of bits corresponding to a plurality of blocks of counters in a given column in the counter array. The value of each bit can indicate whether the corresponding block of counters has a counter that is nonzero in value. The arbiter can index the first summary bits to determine which blocks in the given column has counters that are nonzero in value and require to be serviced. The first summary bits can be updated whenever a count for any corresponding counter changes.

Second summary bits having a plurality of bits corresponding to a plurality of counters in a given block can be included. The value of each bit can indicate whether the corresponding counter is a nonzero count. The arbiter can index the second summary bits to determine which counters in the given block has counters that are nonzero in value and require to be serviced. The second summary bits can be updated whenever a count for any corresponding counter changes.

The rows of the counter array and the columns of the counter array can represent the destination line card to where the request signal is to be sent and the source line card from where the request signal was received, respectively. The rows of the counter array and the columns of the counter array can represent the third stage crossbar to where the request signal is to be sent and the first stage crossbar from where the request signal was received, respectively. The rows of the counter array and the columns of the counter array can represent the second stage crossbar to where the request signal is to be sent and the source line card from where the request signal was received, respectively.

The first, second and third stage crossbars can further include a plurality of grant handlers. Each grant handler can be associated with one of the output ports of the stage crossbars and configurable to receive the grant signal sprayed by any one of the grant spray engines in the same stage crossbar to which the grant handler is associated. A plurality of data cell handlers can be included. Each data cell handler can be associated with one of the output ports of the stage crossbars and configured to receive the data cell sprayed by any one of the data cell spray engines in the same crossbar to which the data cell handler is associated.

Each of the request handlers in the third stage crossbars can include a counter array having a plurality of rows of counters and a plurality of columns of counters. The counter array can be configured to maintain a count of the request signals received at the output port associated with the counter array and need to be transmitted to one of the destination line cards. The rows can represent the possible source line cards of the request signal and the columns can represent the input ports in the same crossbar to which the counter array is associated. A counter controller can be included that receives the request signals from any one of the input ports and increments the counters in the counter array corresponding to the request signals received, and decrements the counters in the counter array corresponding to the request signals that have been reconstructed for transmission to one of the destination line cards. An arbiter can be included that selects the counters in the counter array with nonzero values to reconstruct them into the requests for transmission to one of the destination line cards. Output logic can be included that reconstructs the counters selected by the arbiter into the request signals for transmission to one of the destination line cards.

In another aspect, the invention provides a line card for a switching device in a network system for transferring data, wherein the switching device has a plurality of line cards. The line card includes a request generator to generate a request signal to be transmitted to a destination line card in order to receive a grant signal authorizing transferring of data to the destination line card. A data cell transmitter is included and configured to transmit a data cell to the destination line card upon receipt of the grant signal from the destination card.

In another aspect, the invention provides a method for transferring data between line cards in a network system having a plurality of line cards and a switching fabric coupled to the line cards. The method includes transmitting a request signal from a source line card to a destination line card through the switching fabric. Upon receiving the request signal at the destination line card, a grant signal is sent from the destination line card to the source line card responsive to the request signal to authorize the source line card to transfer data to the destination line card. A data cell is transferred from the source line card to the destination line card in response to the grant signal received at the source line card.

Among the advantages of the invention are one or more of the following. An inexpensive fabric flow control mechanism is provided by incorporating requests and grants in a data transfer algorithm. The invention provides a request-grant protocol for forwarding packets through a switching fabric and provides an inexpensive means for storing requests and grants in the switching fabric. Data load can be distributed equally across the switching fabric. The algorithms adopted guarantee fairness, i.e., each contender gets an equal share of bandwidth by providing a queue for each possible combination of source and destination.

The invention minimizes reordering of cells (received at the destinations) and allows for easy fault detection and recovery features. The algorithms require minimal queue storage in the switching fabric. The switching fabric provides fairness using a queue organization that requires less storage than a conventional router.

The switching fabric scales much better than conventional approaches because all requests from a given source to a given destination are indistinguishable, as are the grant signals. This allows requests and grants to be combined. The request and grant queues can be implemented relatively inexpensively since requests and grants are very small compared to data cells. Other methods for allocating bandwidth, e.g., a priority based allocation, can be realized by modifying the system request and grant arbiters. An algorithm is provided that can arbitrate over a very large number of requests.

A switching device is provided where control logic and flow control information is distributed over the same components as used in a data path for the switching device. The distribution allows for the amount of control to scale with the size of the data path. The control information can be encoded in a compact way. That is, the amount of state information increases logarithmically as opposed to linearly with a conventional approach.

Other advantages and features will be apparent from the following description and claims.

DETAILED DESCRIPTION

The present invention provides an efficient switching device and methodology for routing packets through a network. A number of terms are used herein to describe network transmissions and related structures and processes.

"Data cell" or "cell" refer to a smallest block of data that is passed through a switching device. The data cell includes a header portion and a data portion. Each packet received on an input port is divided in to one or more fixed length cells. "Cell data" refers to data contained within a data portion of a cell. "Data transfer unit" refers to a cell that includes request and grant information along with cell data.

Figure 1:
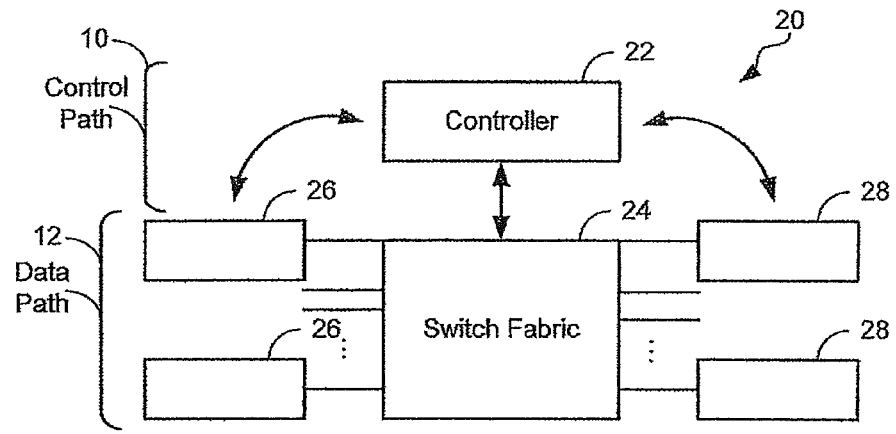
FIG. 1 is a schematic block diagram of a conventional switching device.
Figure 2:
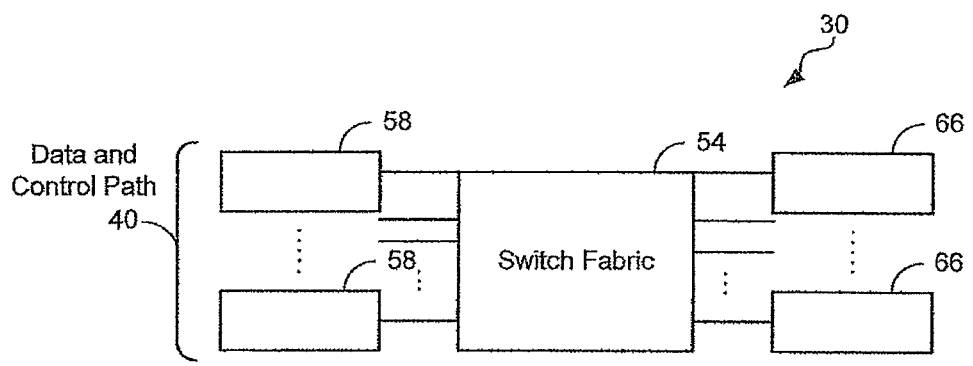
FIG. 2 is a schematic block diagram of a switching device.

Referring to FIG. 2, a switching device 30 includes a data path 40. Data path 40 includes a switch fabric 54, source line cards 58 and destination line cards 66. The data path provides paths for transferring packets from source line cards 58 to destination line cards 66. Unlike a conventional router, the present invention does not require a separate control path. More specifically, the data path is used to control traffic through switching device 30. The use of the data path in the control of data transfers through switching device 30 is described in greater detail below.

Figure 3:
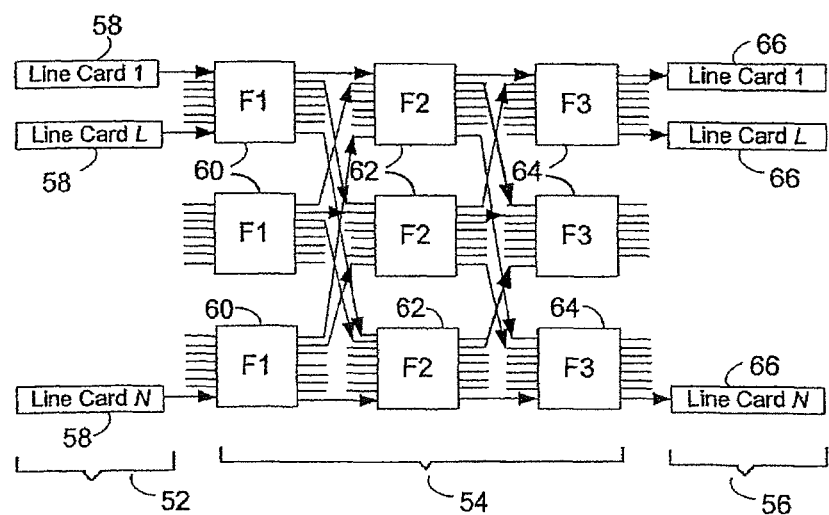
FIG. 3 is a schematic block diagram of a data path of FIG. 2.

Referring to FIG. 3, data path 40 includes an input system 52 having one or more (N) source line cards 58, a switching fabric 54 coupled to input system 52 to receive and transfer data, and an output system 56 having one or more (N) destination line cards 66 and coupled to switching fabric 54 to receive the data. Switching fabric 54 can be a three-stage Clos network. In the implementation shown, switching fabric 54 includes a plurality of crossbars (F1 first stage crossbars 60) in a first stage that are coupled to source line cards 58. A plurality of crossbars (F3 third stage crossbars 64) comprise the third stage of switching fabric 54 and are coupled to destination line cards 66. The second stage of switching fabric 54 includes a plurality of crossbars (F2 second stage crossbars 62) connected between the F1 first stage crossbars 60 and the F3 third stage crossbars 64. A single line card can include both source and destination line card functionality, even though FIG. 3 shows each as distinct elements of the switching device.

Figure 4:
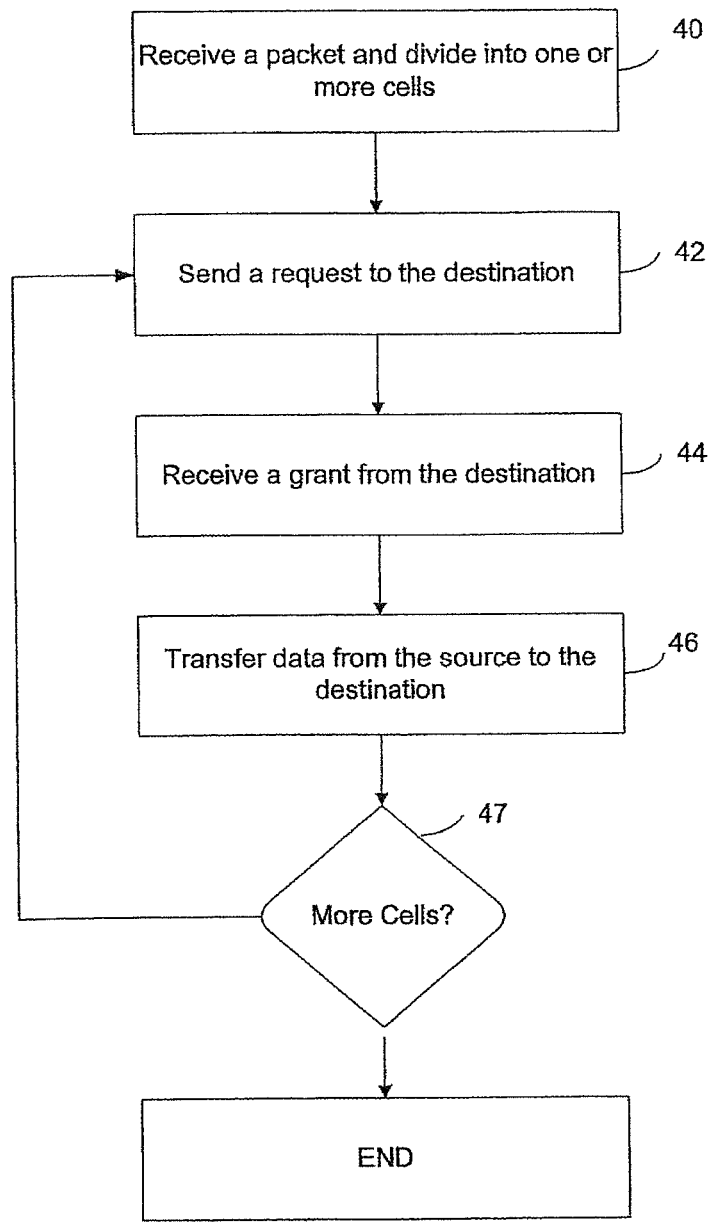
FIG. 4 is a flow diagram of a process for transferring a data cell from a source line card to a destination line card.

Referring to FIGS. 3 and 4, a process for sending data from a source line card 58 to a destination line card 66 is shown. A source line card 58 receives a data packet and divides the packet into one or more cells (step 40). The process for dividing packets in to fixed length cells is described in co-pending patent application to Pradeep Sindhu et al, entitled "Memory Organization In A Switching Device", filed Jul. 24, 1997, Ser. No. 08/901,061, the contents of which are expressly incorporated herein by reference. For each cell, source line card 58 sends a request signal to destination line card 66 via switching fabric 54 (step 42). The request signal includes source and destination line card numbers for the packet. Responsive to the receipt of the request signal, destination line card 66 returns a grant signal via switching fabric 54 that is received by the request generating source line card 58 (step 44). The grant signal also includes the source and destination line card numbers for the packet. A grant signal indicates that the respective destination line card 66 is available to receive a cell from the designated source. Upon receiving the grant signal, source line card 58 transmits a data cell to destination line card 66 (step 46).

A check is made to determine if any more cells for the packet need forwarding to destination line card 66 (47). The process continues until all of the cells for the packet have been transferred. The packet is reassembled at destination line card 66 from the individual cells and transmitted to the network. While the description provided suggests a serial process, the process for sending requests and cell data is pipelined so that multiple requests may be sent prior to sending any cell data.

The requests and grants are part of the fabric flow control mechanism. Arrival of a grant back at source line card 58 indicates that sufficient bandwidth exists in switching fabric 54 for source line card 58 to send a data cell to destination line card 66. This algorithm allows source line cards 58 to send data cells only as fast as switching fabric 54 can support the data traffic.

The request and grant protocol described can be implemented using a queue of requests or grants one for each source/destination line card pair. In one implementation each queue is of the form of a single counter which requires $\log_2(k)$ bits per k-entry rather than a true queue of k bits, as explained in greater detail below. Using counters instead of queues requires dramatically less overhead and storage requirements when supporting a large number of "queues" of grants and requests.

Line Cards

Figure 5:
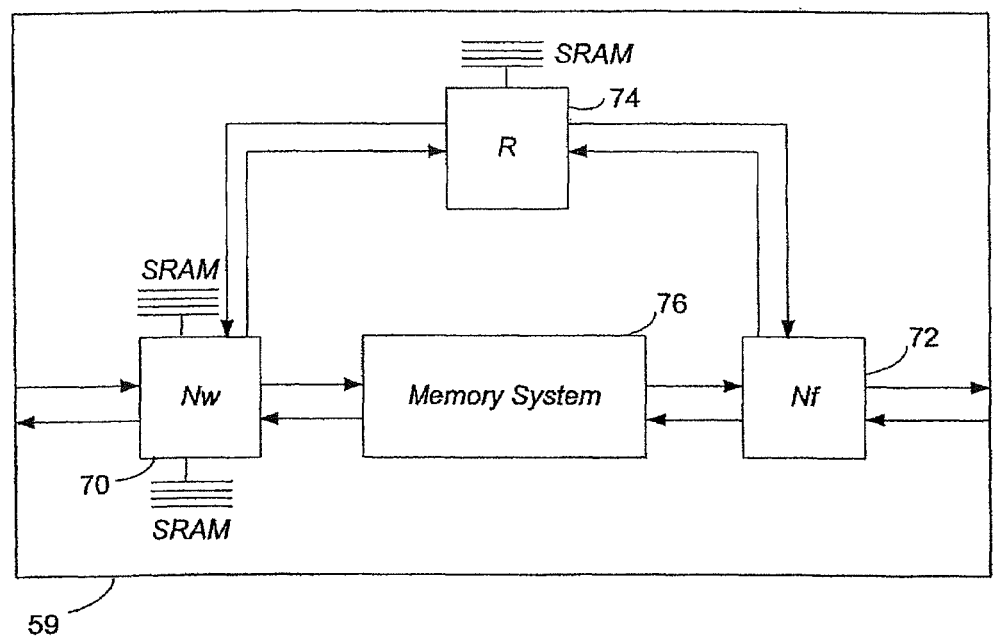
FIG. 5 is a schematic block diagram of a line card.

Referring to FIGS. 3 and 5, a combination line card 59 that includes both source line card 58 and destination line card 66 functionality is shown. The combination line card 59 includes a wide area network interface logic (Nw) 70, a fabric interface logic (Nf) 72, a route lookup system (R) 74, and a memory system 76.

Nw logic 70 receives data packets from an external source, such as a wide area network (WAN), divides the packets into cells, and writes them to memory system 76. Nw logic 70 also extracts keys from the headers of incoming packets and sends them to R system 74 for route lookup to determine the appropriate destination line card 66.

Nf logic 72 reads cell data from memory system 76 and forwards a cell at a time to switching fabric 54 to be delivered to the appropriate destination line card. Nf logic 72 is coupled to one input port of an F1 first stage switch 60 and transmits requests, grants and data cells to switch fabric 54. Nf logic 72 is also coupled to output port of an F3 third stage switch 64 and is operable to receive requests, grants and data cells from switch fabric 54, as explained in greater detail below.

Figure 6:
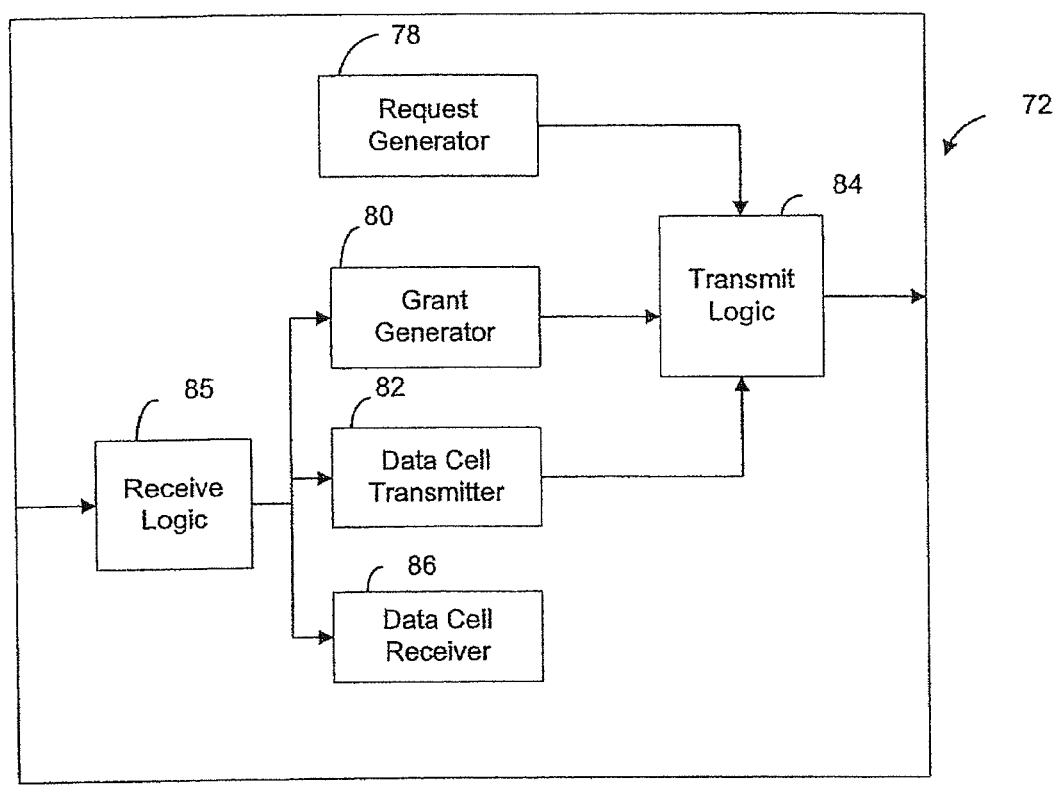
FIG. 6 is a schematic block diagram of fabric interface logic.

Referring to FIG. 6, each Nf logic 72 includes a request generator 78, a grant generator 80, a data cell transmitter 82, transmit logic 84, receive logic 85 and a data cell receiver 86.

As described above, each line card can simultaneously support source line card and destination line card functionalities. That is the line card can be operable to process continuous streams of requests, grants and data cells. The output from a Nf logic 72, a data transfer unit, combines a request, a grant and a data cell. In each cell slot, a data transfer unit is transmitted to F1 first stage switch 60. Similarly, in each cell slot a data transfer unit is received from F3 third stage switch 64 that can include a request, a grant and a data cell. A cell slot is the unit of time required to transmit a data transfer unit to or from the switching fabric.

A data transfer unit includes a plurality of fields. In one implementation, a data transfer unit includes request valid, request source/destination address, grant valid, grant source/destination address, data valid, data source/destination address, cell type, cell full, sequence number, data and CRC fields.

Request, grant and data valid fields indicate, respectively, whether a request, grant or data cell is present in a particular data transfer unit. Address fields indicate both the source and destination line cards 58 and 66 for each of the request, grant and data cell. The data transfer unit can include three pairs of addresses, one each for the request, the grant and the data cell. In one implementation, the fields are sized for a system with a maximum of 1024 line cards. The number of line cards in a system can be easily expanded to support system traffic requirements without changing any interfaces.

Sequence number, and cell type and cell full fields are not used by switching fabric 54, but are used by destination line card 66 to reassemble data cells into packets. The sequence number field specifies the relative order of the data cell so packets can be reassembled in the correct order at destination line card 66. There is a separate sequence number space for each source-destination pair. The cell type field specifies whether the cell is the first cell of a packet, the last cell, a middle cell, or a single-cell packet, and whether or not an indirect cell (linked-list pointer storage) must be allocated for future cells. The cell full bit is only valid if the cell is the last cell of a packet. If the bit is not set, then the data cell includes padding beyond the end of the packet data, and the last byte of the data cell is indicated by the data field.

The CRC field is a CRC-16 check value computed over the rest of fields, including the data cell and all of the overhead fields. The total size of a data transfer unit can be 594 bits. The total size of the header can be 82 bits, where the header consumes 14% of the link bandwidth.

Referring again to FIGS. 3 and 6, request generator 78 and data cell transmitter 82 provide source line card services. Grant generator 80 and data cell receiver 86 provide destination line card services. Receive logic 85 receives cells (data transfer units) from F3 third stage switch 64 and separates the request, grant and data cell portion, which are transferred to grant generator 80, data cell transmitter 82 and data cell receiver 86, respectively. Request generator 78 and grant generator 80 generate requests and grants, respectively, and transfer them to transmit logic 84. Similarly, data cell transmitter 82 transmits data cells to transmit logic 84. Transmit logic 84 combines the requests, grants and data cells into data transfer units and then transmits the data transfer units to F1 first stage switch 60.

Figure 7:
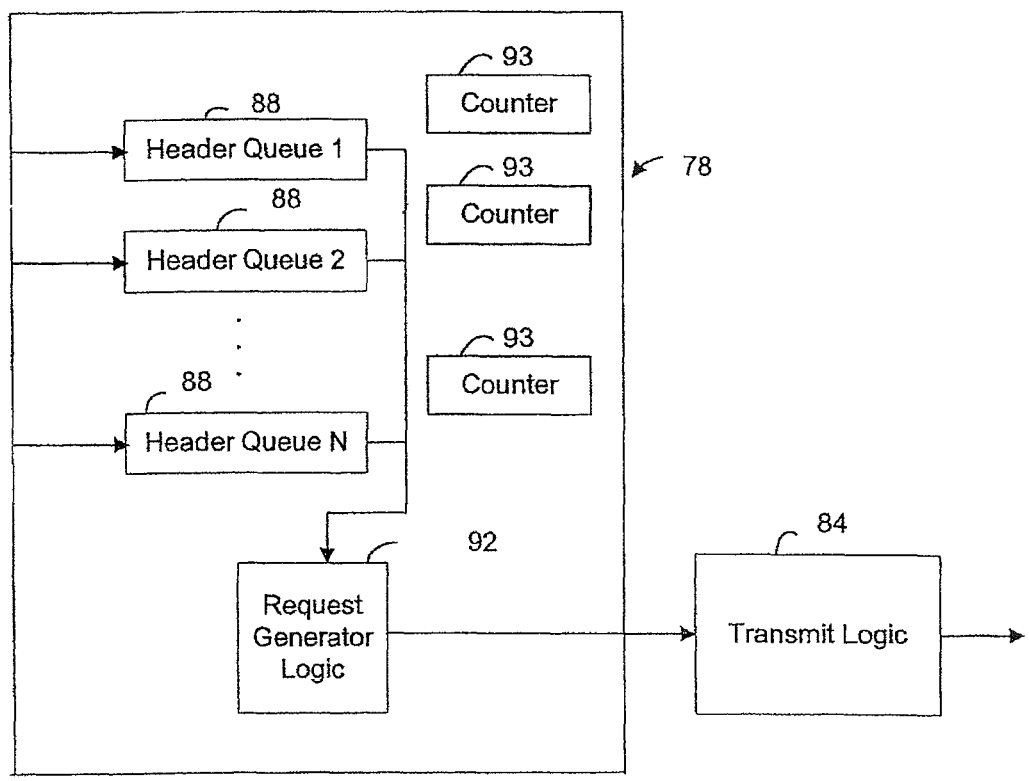
FIG. 7 is a schematic block diagram of a request generator in the fabric interface logic of FIG. 6.
Figure 8:
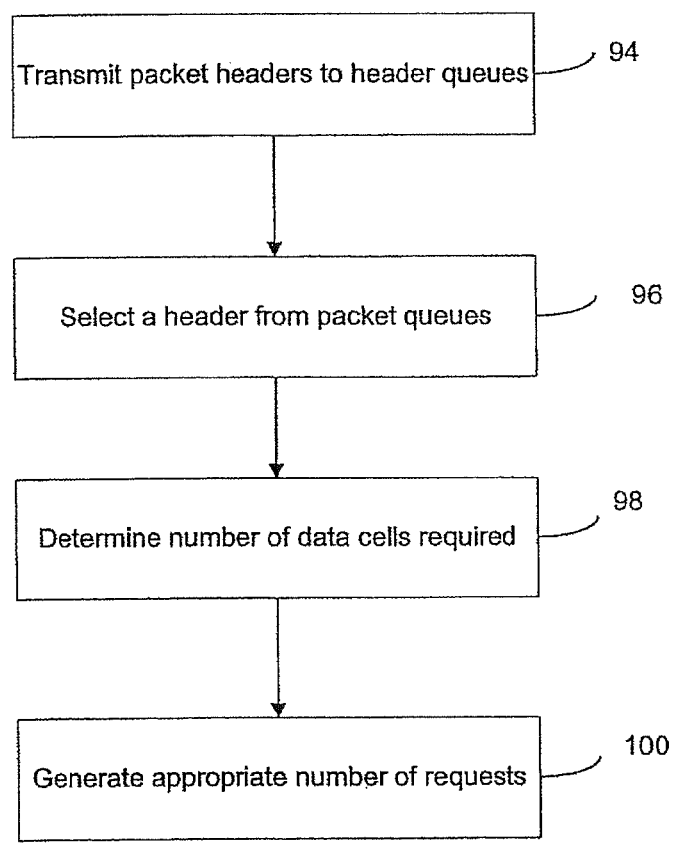
FIG. 8 is a flow diagram for a process of generating a request.
Figure 9:
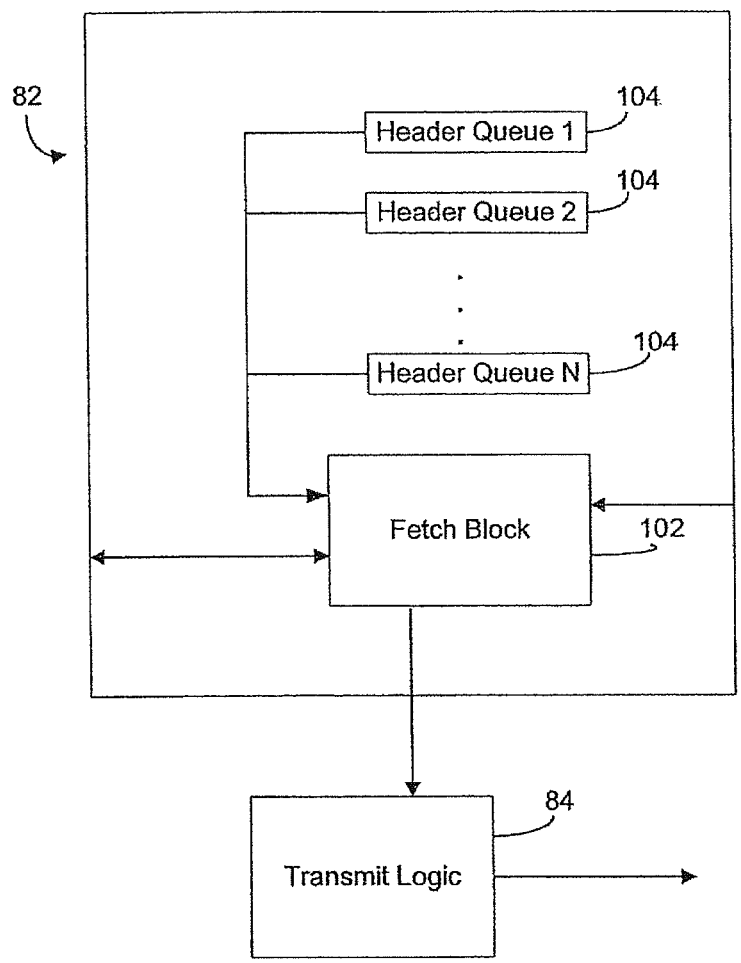
FIG. 9 is a schematic block diagram of a data cell transmitter of the fabric interface logic of FIG. 6.
Figure 10:
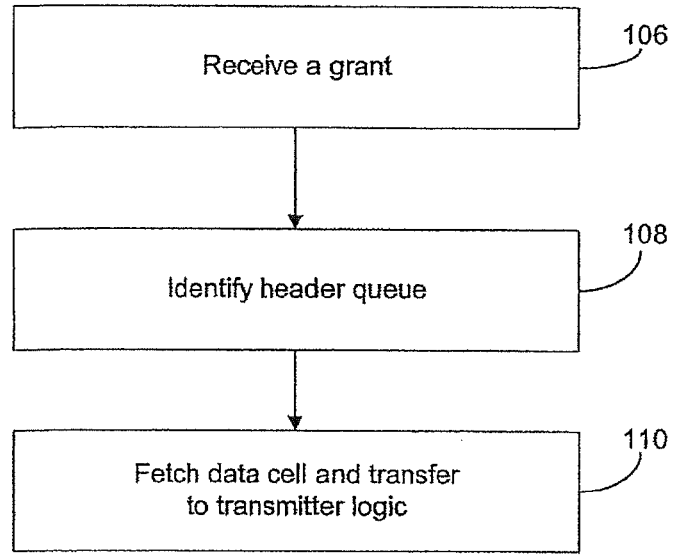
FIG. 10 is a flow diagram for a process of transmitting a data cell.

Referring to FIG. 7, request generator 78 includes N number of header queues 88 for storing packet header information and request generator logic 92 for generating requests to be transferred to transmit logic 84. Packets received by the line card include a packet header. The packet header includes source and destination network addresses and length data. The length data defines the length of the packet. In one implementation, after cells for a packet are loaded into memory system 76, a packet header is transferred to header queues 88 from memory system 76 by a memory controller (not shown).

Each header queue 88 is associated with a single destination line card 66 to prevent head-of-line blocking.

Referring to FIGS. 3, 5, 7 and 8, a process for generating a request includes numerous steps. Memory system 76 transmits packet header information to header queues 88 for each packet received and stored in the memory system 76 (step 94). Alternatively, header queues 88 may be configured to retrieve header information from memory system 76.

Request generator logic 92 selects a header from one of header queues 88 (step 96) and determines how many data cells are required to transmit the entire packet (step 98). Each packet may vary in size and may require a different number of requests to be generated. In one implementation, request generator logic 92 services header queues 88 in a round-robin fashion. Alternatively, each header may include priority data defining a priority level associated with the corresponding packet. Request generator logic 92 may give preference to packets with higher priority levels.

Request generator logic 92 generates an appropriate number of requests (based on the size of the packet) and transfers each to transmit logic 84 for transmission to F1 first stage switch 60 associated with that particular line card (step 100). Each request includes the source and destination address, but no identifier to a particular data packet that is to be transferred.

Referring again to FIG. 7, in one implementation, request generator logic 92, includes a plurality of credit counters 93 for limiting the number of outstanding requests sent to switching fabric 54. One credit counter 93 is provided (for each destination) per plane. Initially each counter is set to a maximum value, e.g., 64 or 128. A corresponding credit counter is decremented every time a request is sent. If a credit counter value reaches zero, request generator logic 92 temporarily stops generating requests for that destination. When a grant arrives for that destination, credit counter 93 is incremented and normal operation can resume. The maximum credit counter value can be equal to the maximum counter value in switching fabric 54 for storing requests and grants so counters in the switching fabric never overflow.

Referring back to FIG. 6, grant generator 80 generates grant signals responsive to request signals received from F3 third stage switch 64 via receive logic 85. In one implementation, the grant signals are generated immediately upon receipt of a request signal. The request signal can be from any one of N number of line cards 58, including the receiving line card itself. In one implementation, a request signal is of the same form as a grant signal, and merely includes swapped source and destination line card numbers in the request signal. The grant signal is output to transmit logic 84 to be transmitted to F1 first stage switch 60 associated with the particular destination line card. As described above, both request signals and grant signals travel in a similar fashion through the switch fabric. That is, each of the request signals and grant signals are passed from a respective line card to the first stage of the switch fabric. Both flow through the switch fabric in the same direction, passing from the first stage to the third stage and ultimately to a desired line card.

Referring to FIGS. 3, 6, 7 and 9, data cell transmitter 82 includes a fetch block 102 and a plurality of header queues 104. Fetch block 102 receives as an input grant signals from receive logic 85. Each header queue 104 contains packet headers. Request generator 78 sends the packet headers to header queues 104 of data cell transmitter 82 upon selecting a packet to transmit from its header queues 88. There are N number of header queues 104, one for each destination line card 66 operable in the system.

In operation, referring to FIGS. 3, 5, 6, 9 and 10, fetch block 102 receives, via receive logic 85, a grant signal returned by a destination line card 66 (step 106) and identifies an appropriate header queue 104 to obtain the address of the next data cell stored in memory system 76 to be transferred to the designated destination line card (step 108). Fetch block 102 retrieves the designated data cell from memory system 76 and transmits it to transmit logic 84 to be forwarded to F1 first stage switch 60 (step 110). Alternatively, fetch block 102 may instruct memory system 76 to transmit the data cell directly to transmit logic 84.

As described above, a grant signal does not correspond to a particular data cell. The grant merely reflects that bandwidth exists for transmissions between the particular source line card and the designated destination line card. The grant is a general authorization from a particular destination line card 66 to a requesting source line card 58 to transmit a data cell in the next cell slot. As such, the giant can be easily propagated through the switch fabric with very small overhead. The grant signal that triggers the transmission of a particular cell does not need to correspond to the request cell that was generated for the given cell. For example, cells from a data packet having a very high priority may be loaded into the top of its associated header queue 104. The high priority cells can be transferred through the switch fabric quickly and without waiting for a grant signal that directly corresponds to request signals generated when the cells arrived in system memory 76. As described above, in one implementation, the grant signal includes only source and destination line card numbers.

Referring back to FIG. 6, transmit logic 84 receives requests, grants and data cells output by request generator 78, grant generator 80 and data cell transmitter 82, respectively, and combines them to form data transfer units. The request generator 78, grant generator 80 and data cell transmitter 82 all function independently of each other so the request, grant and data cell within a single data transfer unit generally are not related, i.e., the requests, grants and data cells are being sent to different destination line cards 66.

Figure 11:
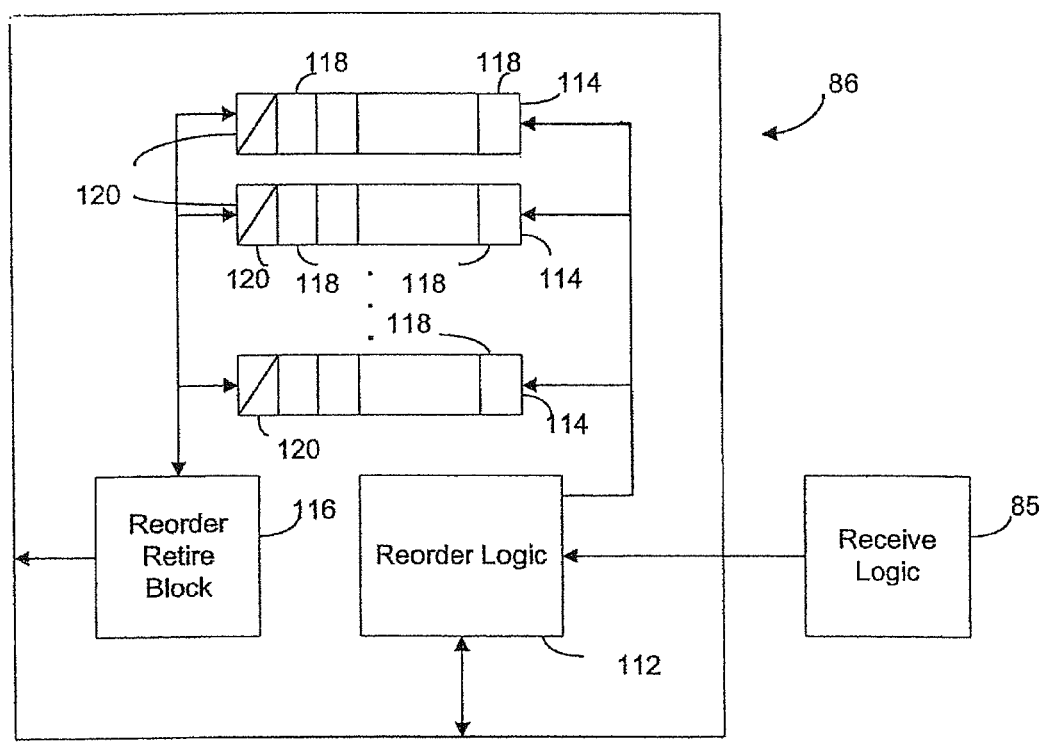
FIG. 11 is a schematic block diagram of a data cell receiver of the fabric interface logic of FIG. 6.

Referring to FIGS. 3, 6 and 11, data cell receiver 86 includes reorder logic 112, N number of reorder arrays 114 and a reorder retire block 116. Reorder logic 112 receives data cells from receive logic 85 and reassembles individual packets. Each of reorder arrays 114 are used by reorder logic when reassembling received data cells into packets. In one implementation, N number of reorder arrays 114 are provided, one for each source line card 58.

Each reorder array 114 includes a plurality of slots 118 to store pointers to data cells. Although data cells associated with a packet are transmitted sequentially from source line card 58, they may arrive out of order at destination line card 66 since each data cell may experience varying levels of congestion depending on the paths traveled. The congestion level may vary for each plane in a multi-plane switch fabric and for different paths within each plane. Switch fabrics with multiple planes are described in greater detail below. A sequence field associated with a data cell is used to reassemble the data cells in a proper order. In one implementation, the low order bits of the sequence field are used as an index to determine the correct slot within the reorder array. Reorder retire block 116 extracts (retires) pointers from the reorder array 114 in right order, reproducing the original packet.

Figure 12:
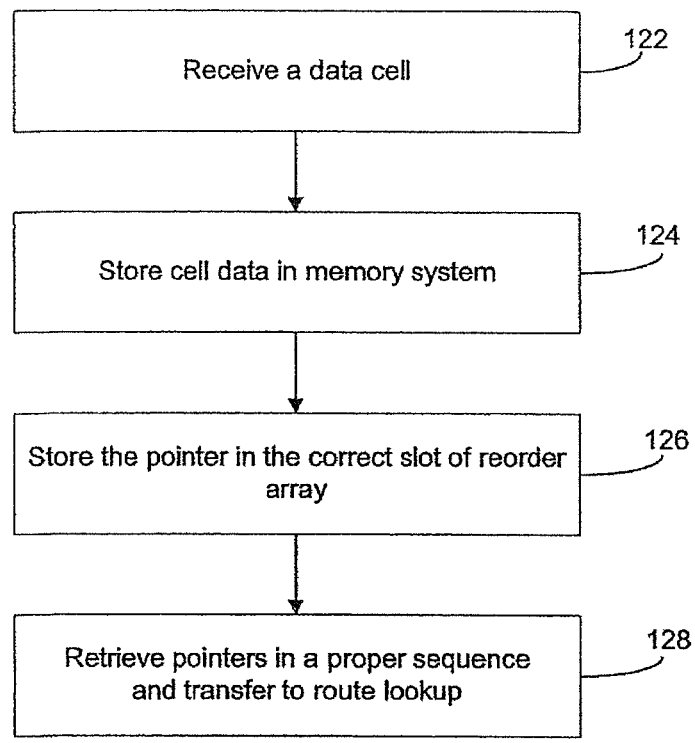
FIG. 12 is a flow diagram for a process of reassembling data cells into packets at the destination line card.

Referring to FIG. 12, the steps involved in reassembling a packet from data cells received at destination line card 66 include receiving one or more data cells associated with a packet from receive logic 85 (step 122). Reorder logic 112 extracts the fabric header from each data cell and transfers the cell data to memory system 76 (124). Memory system 76 stores the cell data and sends back to reorder logic 112 a pointer to the cell data stored in memory system 76. Reorder logic 112 uses data from the extracted header as a pointer which in turn is stored in a correct slot 118 in an appropriate reorder array 114 (step 126). The source line card 58 number and the sequence field in the header are used to determine a correct reorder array and correct slot 118 within the correct reorder array 114, respectively. Reorder retire block 116 retrieves pointers in a proper sequence and transfers them to route look-up engine 74 (step 128). Reorder retire block 116 retrieves pointers in a proper sequence by checking start slot 120 in each reorder array 114 and retrieving a pointer stored therein. Every time a pointer is pulled from a start slot 120 of a reorder array 114, all the remaining pointers in that reorder array move one slot forward. In one implementation, start slot 120 moves one slot backward. The movement of the start slot can be tracked using a pointer. As long as start slot 120 contains a pointer, reorder retire block 116 continues to retrieve pointers stored in reorder array. If start slot 120 is empty, reorder retire block 116 waits for start slot 120 to be filled.

Route look-up engine 74, therefore, receives the pointers to cell data stored in memory system 76 in the sequence in which they were sent.

Switch Fabric

Referring back to FIG. 3, in one implementation, switching fabric 54 is a three stage Clos network that supports N line cards and includes L number of F1 first stage crossbars 60, L number of F2 second stage crossbars 62 and L number of F3 third stage crossbars 64, each crossbar having L number of input ports and L number of output ports, where L is equal to the square root of N. According to the Clos topology, output port l of the $k^{th}$ crossbar in one stage is connected to input port k of the $i^{th}$ crossbar in the next stage. Input ports of each F1 first stage switch 60 are coupled, respectively, to L number of source line cards 58, more specifically, to transmit logic 84 of a respective source line card 58. Similarly, output ports of each F3 third stage crossbar 64 are coupled, respectively, to L number of destination line cards 66, more specifically, to receive logic 85 of a respective destination line card 66. In one implementation, a fully-populated system supports a maximum of N=L*L line cards, where N is 1024.

Figure 13:
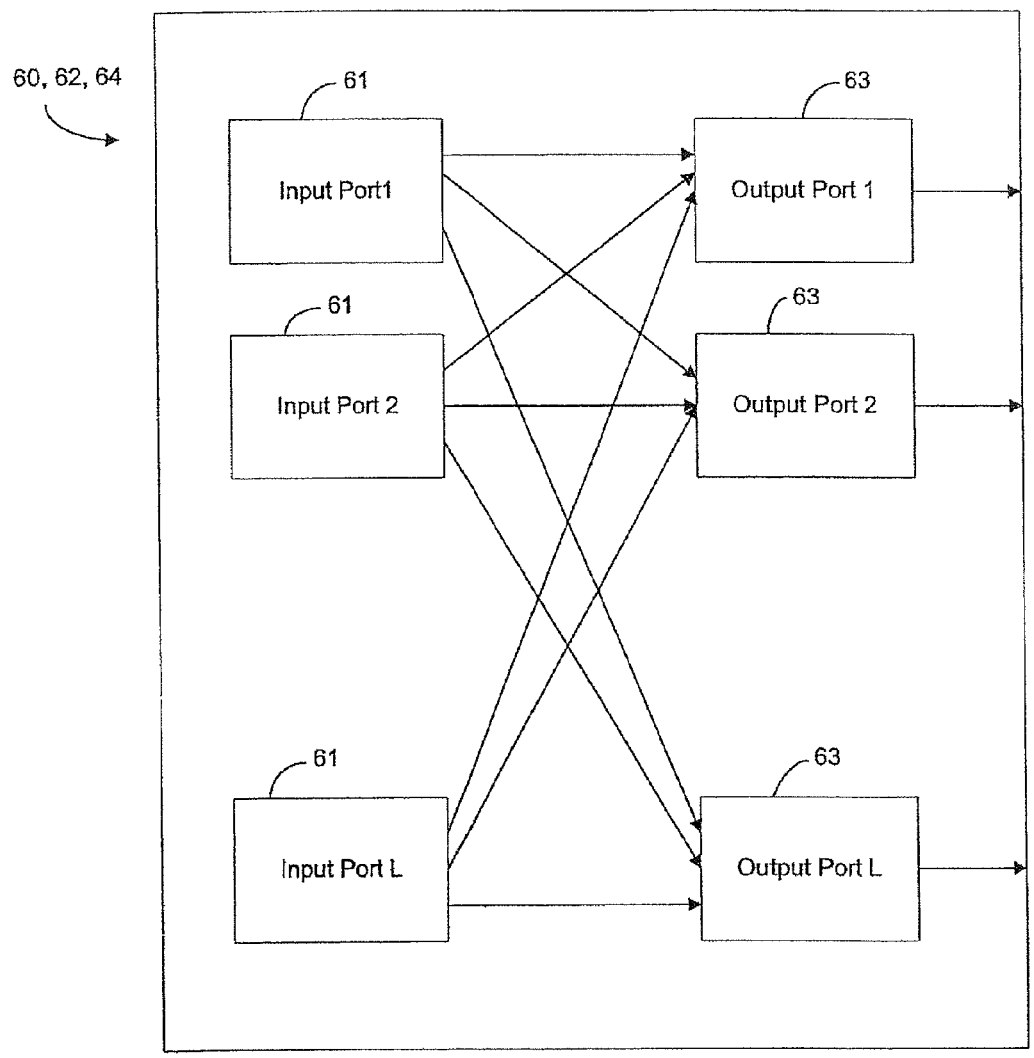
FIG. 13 is a schematic block diagram of a F1 first stage crossbar
Figure 14:
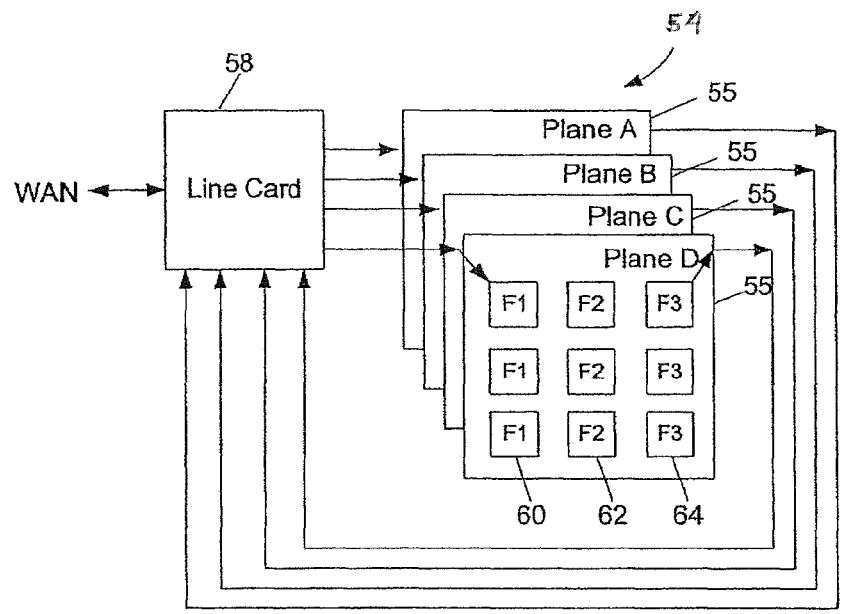
FIG. 14 is a schematic block diagram of a switching fabric having a plurality of planes.

Referring to FIGS. 3 and 13, each input port 61 of F stage crossbars 60, 62 and 64 may be switched to any one of output ports 63 within the same F stage crossbar Referring to FIG. 14, switching fabric 54 may include a plurality of independent Clos networks, i.e., planes 55. Each plane 55 contains L number of F1 first stage crossbar 60, L number of F2 second stage crossbar 62 and L number of F3 third stage crossbar 64, as described above with reference to FIG. 3. Each plane 78 has bandwidth $B_f/p$, where $B_f$ is the bandwidth of switching fabric 54 and p is the number of planes in the switching fabric. The fabric bandwidth $B_f$ may be increased by adding additional planes 55 to switching fabric 54. In one implementation, switching fabric 54 has four planes 55. FIG. 14 shows an implementation where source line card 58 and destination line card 66 are included in a single line card which is therefor connected to one of input ports 61 of F1 first stage crossbar 60 and one of output ports 63 of F3 third stage crossbar 64 for each plane 55.

Figure 15:
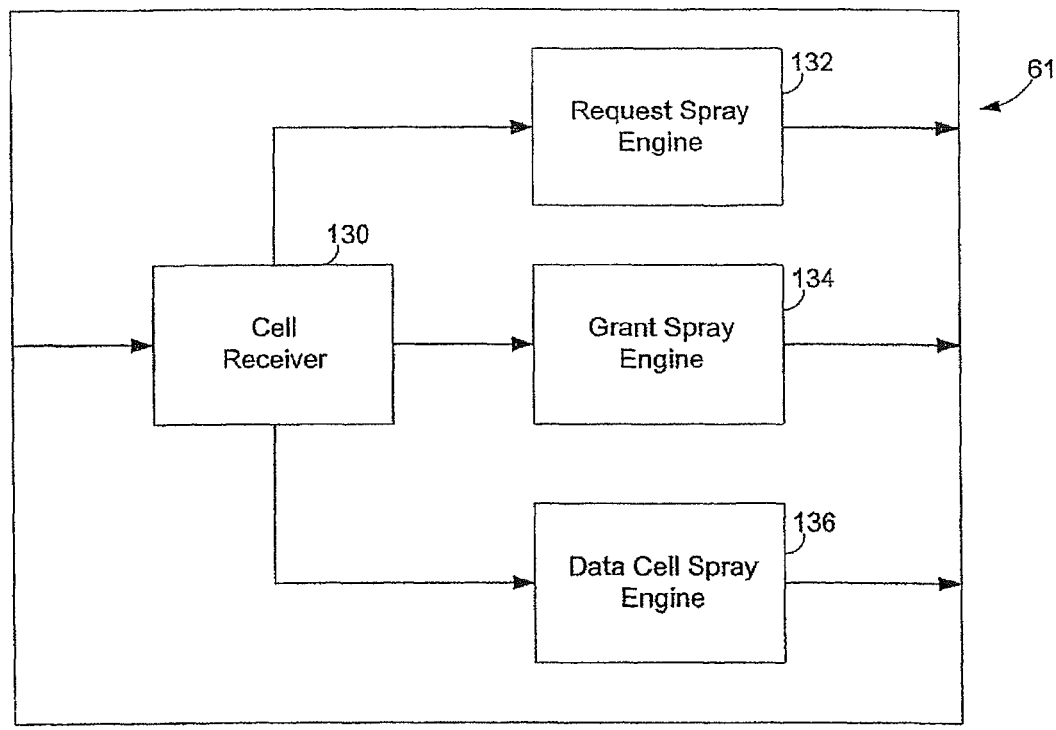
FIG. 15 is a schematic block diagram of an input port of the F1 first stage crossbar

Referring to FIGS. 13 and 15, each input port 61 of an F1 first stage crossbar 60 includes a cell receiver 130, a request spray engine 132, a grant spray engine 134, and a data cell spray engine 136. Cell receiver 130 receives data transfer units, including requests, grants and a data cell, transmitted by transmit logic 84 of source line card 58 and separates the received data transfer units into requests, grants and data cells. The separated portions are forwarded to request spray engine 132, grant spray engine 134 and data cell spray engine 136, respectively.

Request spray engine 132, grant spray engine 134 and data cell spray engine 136 select, respectively, output ports 63 to send the request, grants and data cells. A given request is sent to one output port, but a stream of consecutive requests is sent to multiple ports. Selecting an output port 63 is equivalent to selecting F2 second stage crossbar 62 to transmit the requests since each output port 63 of F1 first stage crossbar 60 is hardwired to one of F2 second stage crossbars 62. Request spray engine 132, grant spray engine 134 and data cell spray engine 136, respectively, spray across the different output ports 63 so as to fairly distribute the load to all F2 second stage crossbars 62, as explained in greater detail below.

Figure 16:
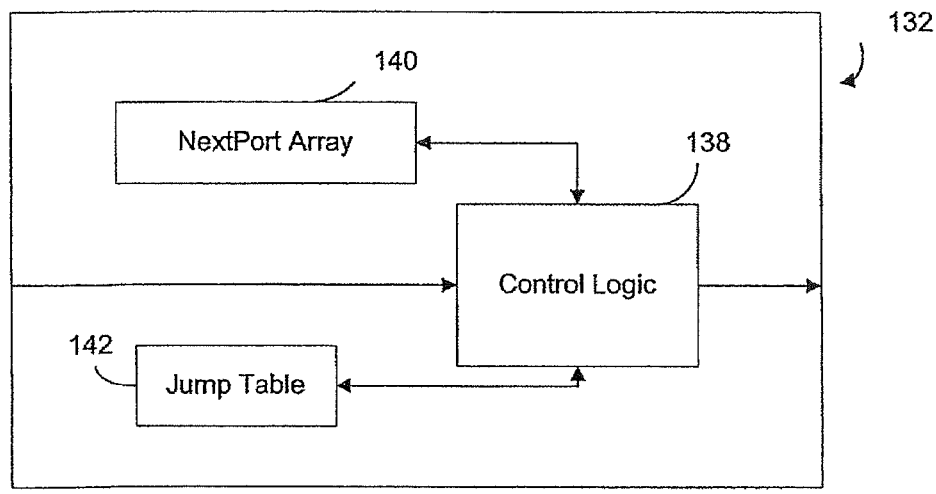
FIG. 16 is a schematic block diagram of a request spray engine in an input port of the F1 first stage crossbar in FIG. 15.

Referring to FIG. 16, request spray engine 132 includes control logic 138, a pointer array (NextPort array) 140 and a jump table 142. Control logic 138 receives requests forwarded from cell receiver 130 and sprays the requests to output ports 63 by evaluating the NextPort array 140 according to the destination of the request.

NextPort array 140 contains a plurality of pointers for selecting output ports 63 to where the requests are to be sprayed. Jump table 142 contains a plurality of pointers pointing to output ports 63 in a predetermined sequence for updating the pointers in NextPort array 140. NextPort array 140 includes N pointers, one for each possible destination of the requests, each pointer pointing to a particular output port to use in sending a request to that destination.

Figure 17:
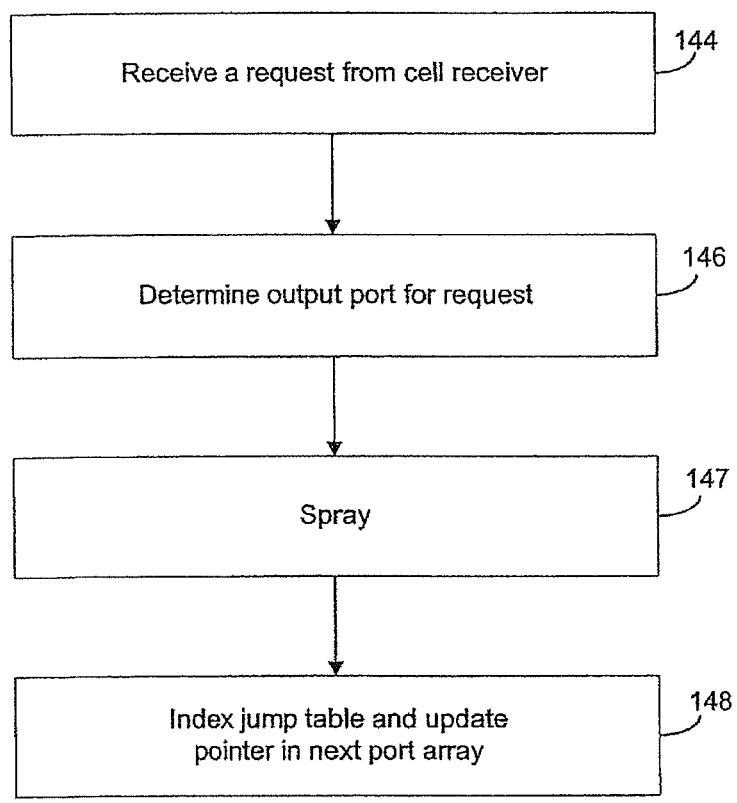
FIG. 17 is a flow diagram of a process of spraying a request from an input port of the F1 first stage crossbar to one of the output ports of the same F1 first stage crossbar

Referring to FIGS. 16 and 17, the steps involved in spraying requests from input port 61 to output port 63 include receiving a request from cell receiver 130 (at control logic 138) (step 144). An output port that is to receive the cell is identified (step 146). More specifically, control logic 138 uses the destination of the request to determine a "correct pointer" in the NextPort array 140 to evaluate. The output port indicated by the correct pointer determines the port to which the request is to be sprayed. In one implementation, the output port is determined by setting the port (p) to be equal to the d'th element of the NextPort array 140, where d is the destination line card address. After spraying the request to the appropriate port (147), control logic 138 determines a next port in jump table 142 associated with the request destination. The correct pointer in the NextPort array 140 that was used in evaluating the current request (the correct pointer), is then updated with the new (next) port pointer information retrieved from jump table 142 (step 148). In one implementation, the NextPort array 140 is updated by setting the d'th element of the NextPort array 140 to the p'th entry of the jump table, where p is the port that was selected in step 146. In this implementation, requests sent to the same destination and arriving consecutively in time at the same request spray engine, will be sprayed to different output ports 63. For example, if the destination of the request is to the fifth destination line card 66, the value of the fifth entry in the NextPort array 140 is 2, and the value of the second entry of the jump table is 3, then the new value of the fifth entry of the NextPort array is set to 3, and the request is sent out to port 2.

In one implementation, each grant spray engine 134 of input port 61 has a structure identical to request spray engine 132, and operates in a manner that is similar to that described above with regard to request spray engine 132.

Figure 18:
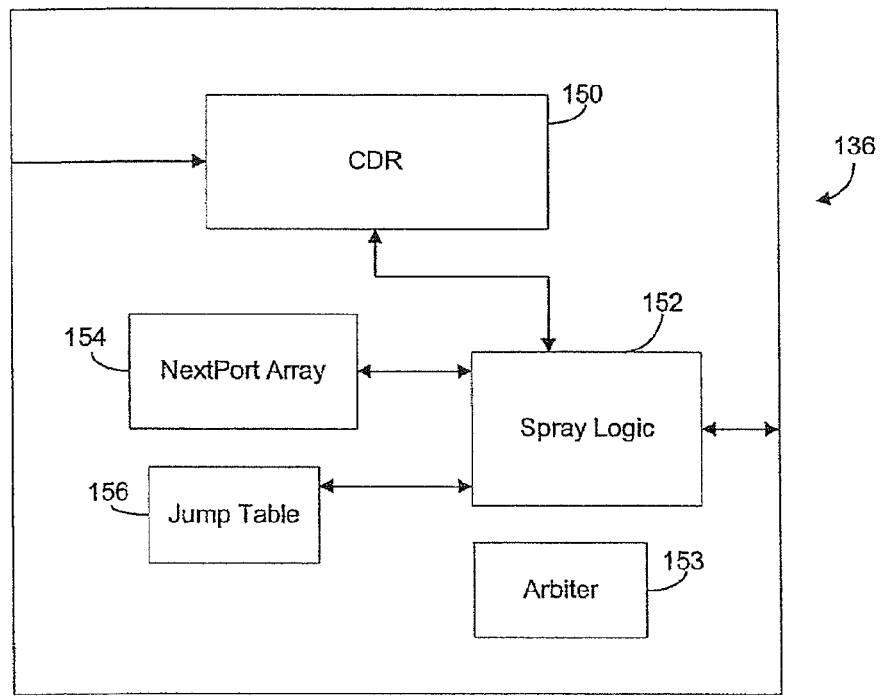
FIG. 18 is a schematic block diagram of a data cell spray engine in an input port of the F1 first stage crossbar in FIG. 15.
Figure 19:
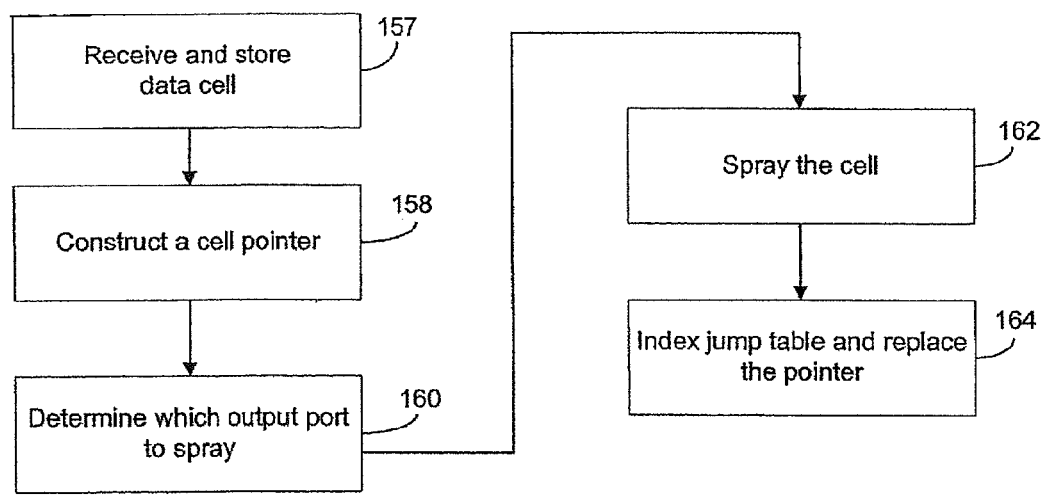
FIG. 19 is a flow diagram of a process of spraying a cell pointer from an input port of the F1 first stage crossbar to one of the output ports of the same F1 first stage crossbar

Referring to FIGS. 13, 15 and 18, data cell spray engine 136 of input port 61 includes a cell data RAM (CDR) 150, spray logic 152, arbiter 153, a pointer array (NextPort array) 154 and a jump table 156. CDR 150 stores data cells received from cell receiver 130. Spray logic 152 selects the particular output port 63 to spray the data cell. Each input port 61 is provided with its own CDR 150 to prevent contention with data cells arriving at other input ports 61. NextPort array 154 and jump table 156 have the same configuration and function identically as those of request spray engine 132. Arbiter 153 is described in greater detail below.

Referring to FIGS. 13, 15, 18 and 19, in operation, CDR 150 receives and stores a data cell from cell receiver 130 (step 157). Spray logic 152 reads the header of the data cell stored in CDR 150 and constructs a cell pointer to the data cell stored in CDR 150 (step 158). Spray logic 152 determines which output port to spray the cell using the destination as an index to the appropriate entry (pointer) in NextPort array 154 (step 160). Spray logic 152 sprays the cell pointer to the output port designated by the appropriate pointer of NextPort array 154 (step 162). Spray logic 152 indexes jump table 156 and replaces the pointer just used with a pointer that is next in sequence, as described above with respect to request spray engine 132 (step 164).

Figure 20:
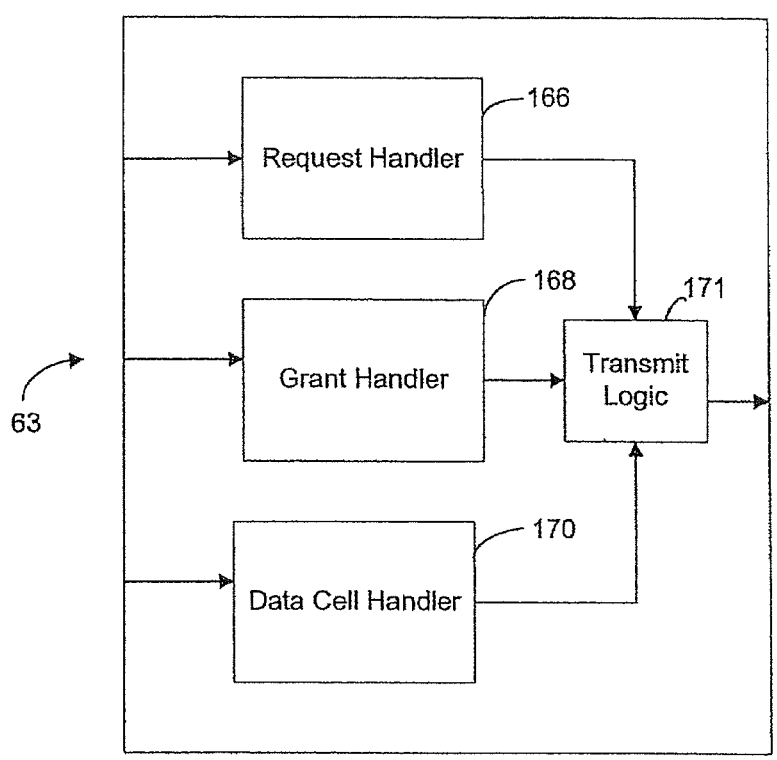
FIG. 20 is a schematic block diagram of an output port of the F1 first stage crossbar
Figure 22A:
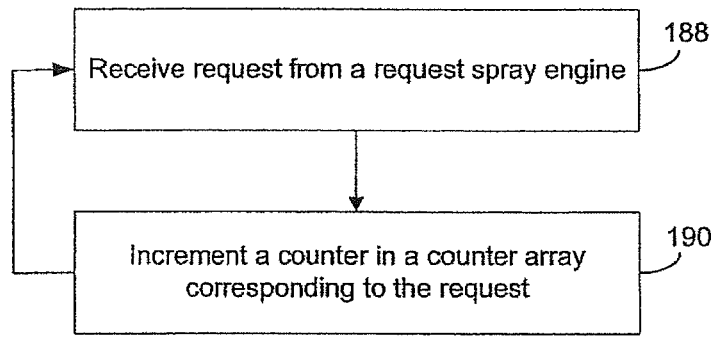
FIGS. 22a and 22b show processes for transmitting a request from the request handler to one of the F2 second stage crossbars.
Figure 22B:
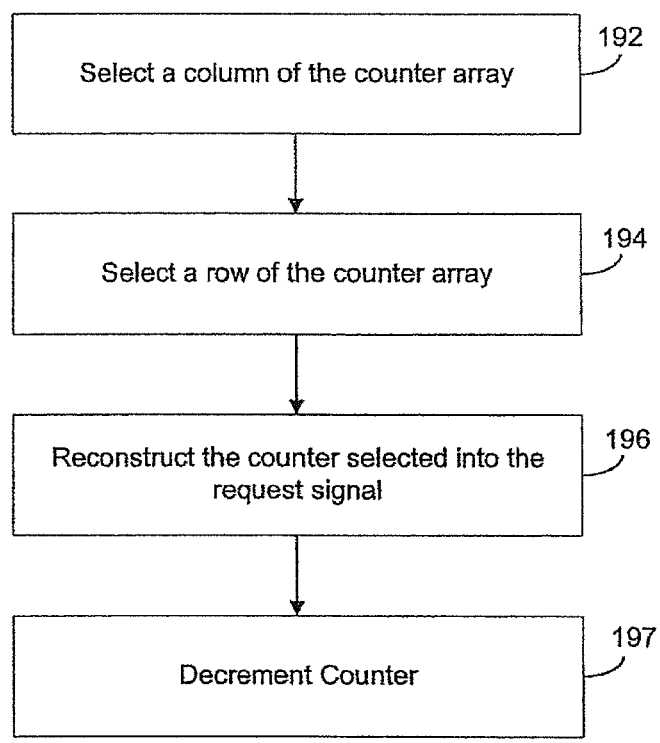

Referring to FIGS. 13 and 20, each output port 63 includes a request handler 166 which receives requests and temporarily stores the requests, a grant handler 168 which receives grants and temporarily stores the grants, a data cell handler 170 which receives pointers to data cells and temporarily stores the data cells and transmit logic 171 for transmitting the requests, grants and data cells to F2 second stage crossbar 62. Request handler 166 may receive requests from request spray engine 132 in any input port 61. Similarly, grant handler 168 and data cell handler 170 may receive grants and data cells, respectively, from grant spray engine 134 and data cell spray engine 136 in any input port 61. Handlers 166, 168 and 170 store requests, grants and data cells received from input ports 61 and transfer them at an appropriate time to transmit logic 171 to be sent to F2 second stage crossbar 62. Transmit logic 171 combines the requests, grants and data cells to form data transfer units before transmitting them to F2 second stage crossbar 62.

Figure 21:
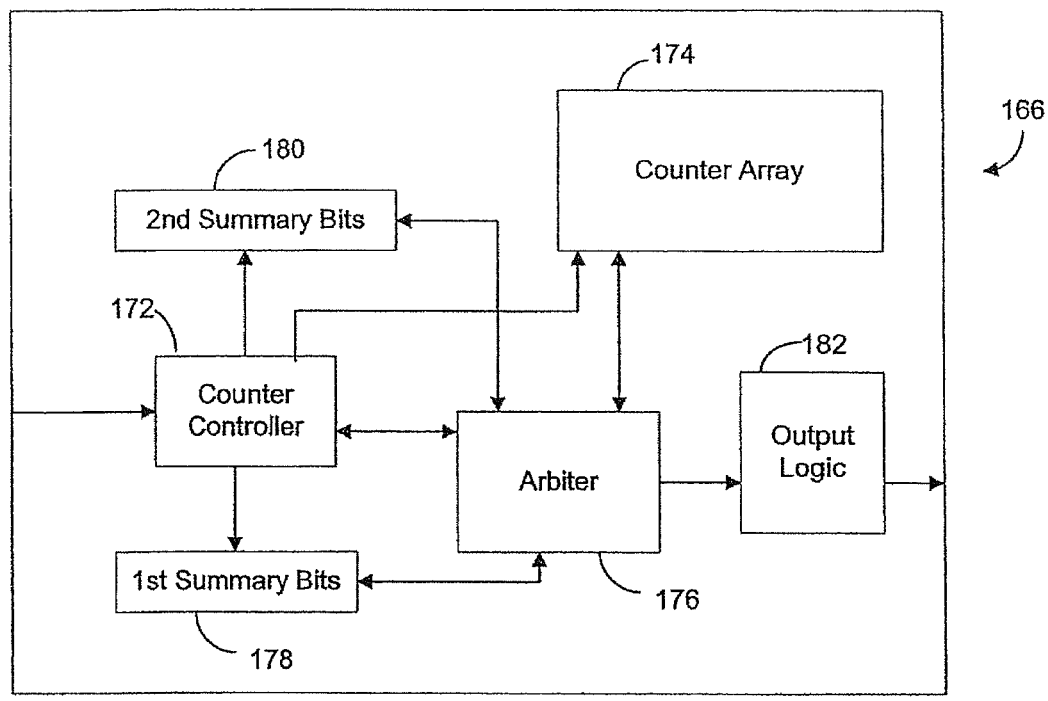
FIG. 21 is a schematic block diagram of a request handler in the output port of the F1 first stage crossbar in FIG. 20.

Referring to FIGS. 15, 20 and 21, request handler 166 includes a counter controller 172, a counter array 174, a round-robin arbiter 176, output logic 182 and optionally first and second summary bits 178 and 180, respectively. Counter controller 172 receives requests from request spray engine 132 in any input port 61. Counter array 174 stores the source-destination information of the requests. Round-robin arbiter 176 selects the next request to be transmitted. First and second summary bits 178 and 180 can be used to speed the arbitration process. In one implementation, first and second summary bits together point to non-empty counters (i.e., requests) in the counter array 174 requiring the services of arbiter 176. Output logic 182 reconstructs counters selected by arbiter 176 into requests and transfers them to transmit logic 171.

Each counter array 174 has N rows and L columns of counters. The N rows of counters represent the possible destinations of requests, and the L columns of counters represent the possible sources of requests. There are only L columns since each F1 first stage crossbar 60 is coupled only to L number of source line cards 58. Counter array 174 provides an inexpensive means of implementing request queues. Requests are completely specified by their source and destination line card numbers. When counter control 172 receives a request sprayed by request spray engine 132, the source and destination of the request are used to increment the corresponding counter in counter array 174. Similarly, when a request is to be transmitted, counter controller 172 decrements the corresponding counter. Any counters in counter array 174 with nonzero values indicate requests waiting to be transmitted to destination line cards 66. The count in a counter is equivalent to a number of requests waiting to be serviced.

Arbiter 176 includes L number of row pointers, one per column, and one column pointer. Row and column pointers are used to determine which counters in counter array 174 need to be serviced so as to provide all requests received with equal access to output port 182. Arbiter 176 uses the column pointer to select a column of counter array 174, the row pointer associated with that given column to select one of counters within the column to service. Arbiter 176 provides indices, i.e., information on the row and the column, of the selected counter to output logic 182, so that corresponding requests can be reconstructed.

First summary bits 178 include a plurality of bits corresponding to a plurality of blocks of counters for a given column of counter array 174. The value of each bit indicates whether the corresponding block of the counters has at least one counter with a non-zero value. For example, a binary 1 for a given bit in first summary bits 178 can indicate that the corresponding block has at least one counter with a non-zero value. Alternatively, a binary 0 can be used for this purpose. Counter controller 172 updates first summary bits 178 every time a count changes in counter array 174. Similarly, second summary bits 180 include a plurality of bits corresponding to a plurality of counters within a given block of counters. The value of each bit indicates whether one of a group of corresponding counters in a block has a non-zero value. Counter controller 174 updates second summary bits every time a count changes in counter array 174. As with first summary bits 178, either binary 1 or 0 may be used to indicate one of the counters in the group of counters has a non-zero value. The summary bits provide all the information arbiter 176 needs to choose a next counter without individually examining each counter. In one implementation, the summary bits are updated incrementally whenever a counter changes, so maintaining the summary bits does not require individually examining each counter.

Referring to FIGS. 15, 21 and 22a and 22b, the operation of request handler 166 is shown. Request handler performs two distinct functions, loading requests and selecting requests to process. Loading requests includes receiving, by counter controller 172, a request from one of request spray engines 132 (step 188). Counter controller 172 increments a counter in counter array 174 corresponding to the request (step 190) and the loading operation continues with a next request. The correct counter to increment is selected using the source and destination addresses in the request.

The selection operation includes the selection of a next column to process in the counter array. More specifically, arbiter 176 uses column pointer 186 to select a next column in counter array 174 which contains a counter with a non-zero count (step 192). Arbiter 176 examines, in a round-robin order, starting from the column selected on the last arbitration cycle until it finds a column having a counter with a nonzero value. Arbiter 176 uses first summary bits 178 to quickly determine whether a column has a counter with a nonzero count. For example, given a counter array with 16 columns, first summary bits 180 having the value of 0000,1000,0000, 1000 indicates that fourth and twelfth columns of counters have counters with non-zero values since the fourth and twelfth bits from the right have a binary value 1.

Once a column is selected, arbiter 176 uses a row pointer 184 (not shown) associated with that column to select a counter with a nonzero count within that column to service (step 194). As with selecting a column, arbiter 176 examines each row in a round-robin order starting from the row selected on the last arbitration cycle until it finds a row having a counter with a nonzero value. Arbiter uses second summary bits 180 to quickly determine which group of counters have a counter with a nonzero value. For example, given a counter array with 256 rows divided into groups of 16 (counters), second summary bits 180 having the value of 0100,0000, 0000,0100 indicates that the third and fifteenth groups of counters have nonzero values within that block of counters. The individual counter within a group of counters can be selected by evaluating each of the individual counters.

Arbiter 176 transmits the indices of the selected counter to output logic 182 so that the counter can be reconstructed into a request and transmitted on the next cell slot (step 196). Arbiter 176 also transmits the indices of the selected counter to counter controller 172. Counter controller 172 uses that information to decrement the selected counter to reflect the fact that the counter has been serviced (step 197).

Referring back to FIG. 20, grant handler 168 has the same configuration and operates substantially identically with request handler 166, described above.

Figure 23:
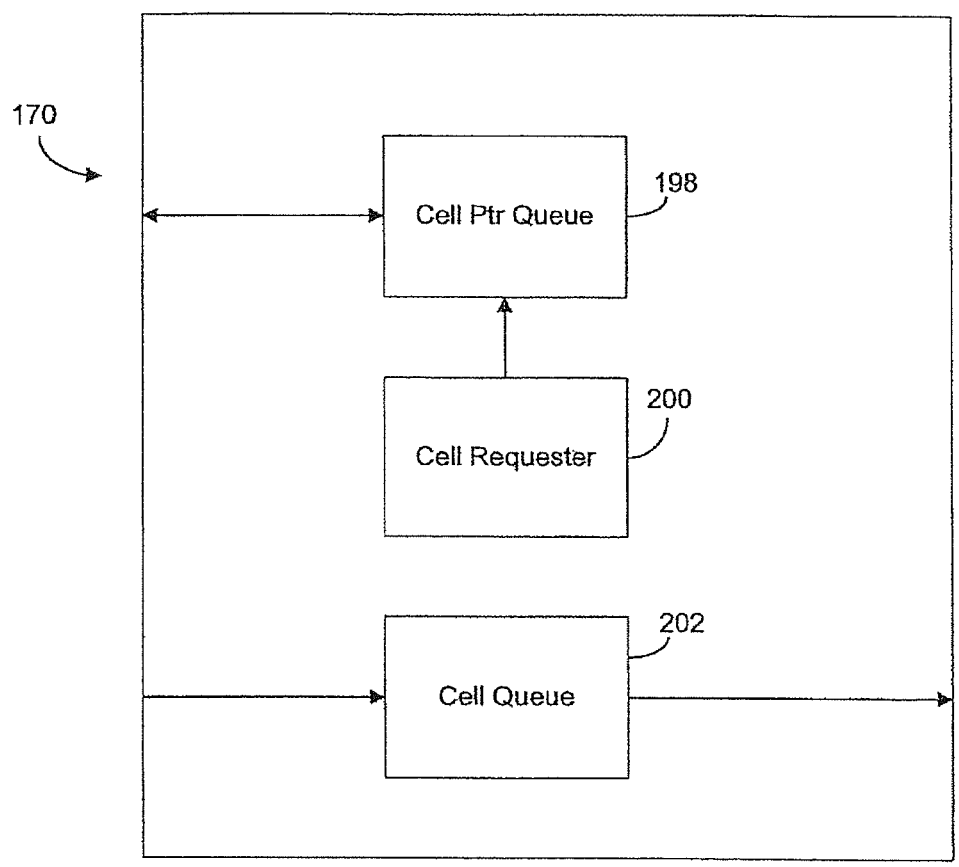
FIG. 23 is a schematic block diagram of a data cell handler in the output port of the F1 first stage crossbar in FIG. 20.

Referring to FIGS. 18, 20 and 23, data cell handler 170 includes a cell pointer queue 198, a cell requester 200, a cell queue 202. Cell pointer queue 198 receives cell pointers output by spray logic 152 of any input port 61. Cell requester 200 selects cell pointers from the head of cell pointer queue 198 for processing. Cell queue 202 receives data cells previously stored in CDR 150. In operation, cell requester 200 sends a selected cell pointer (the cell pointer retrieved from the cell pointer queue 198) to spray logic 152. Upon receiving the returned cell pointer, spray logic 152 at the input port sends all cell pointers arriving at the same cell slot to an arbiter 153. Arbiter 153 selects one cell pointer (in round-robin fashion according to the output port sending the cell pointer). Arbiter 153 sends the selected cell pointer to spray logic 152 which fetches the corresponding data cell from CDR 150 and transfers it to the cell queue 202 for the requesting output port 63. In one implementation, cell queue 202 stores data cells and transfers each to transmit logic 171 on a first-in-first-out basis. In one implementation, the bandwidth between CDR 150 and cell queue 202 are much larger, e.g., twice the bandwidth, than that of the F stage crossbar input and output ports, so that the F stage crossbar may recover from momentary contentions within the crossbar.

Transmit logic 171 in each output port 63 receives requests, grants and data cells from handlers 166, 168 and 170 of the same output port and combines them into data transfer units. The data transfer units are then sent to an F2 second stage crossbar 62 corresponding to that output port.

Like F1 first stage crossbar 60, each F2 second stage crossbar 62 includes L number of input ports and output ports. Each input port 61 of F2 second stage crossbar 62 includes cell receiver 130, request spray engine 132, grant spray engine 134 and data cell spray engine 136. Each output port 63 of F2 second stage crossbar 62 includes request handler 166, grant handler 168, data cell handler 170 and transmit logic 171. These components operate substantially identical to the description provided above with reference to F1 first stage crossbar 60. One difference from F1 first stage crossbar 60 is that F2 second stage crossbar 62 must switch requests, grants and data cells to a particular F3 third stage crossbar according to their respective destinations. Consequently, the values in NextFort arrays in request spray engine 132, grant spray engine 134 and data cell spray engine 136 are initialized to the correct output port for a given destination line card and are never changed. Another difference is that the columns of counter arrays in request handler 166, grant handlers 168 and data cell handlers 170 indicate F3 output ports, and the rows of counter arrays indicate the source line card 58 of the request.

In one implementation, the data provided from the F2 second stage crossbar 62 to an F3 third stage crossbar 63 does not include the higher-order bits of the destination of the request. Each output port of F2 second stage crossbar 62 is initialized to transmit requests to a particular F3 third stage crossbar 64. Therefore at the output port of F2 second stage crossbar 62, the lower-order bits of the destination, which specifies destination line card 66 coupled to the particular F3 third stage crossbar is sufficient to determine the destination of the request.

Similarly, F3 third stage crossbar 64 includes L number of input ports 61 and output ports 63. Each input port 61 includes cell receiver 130, request spray engine 132, grant spray engine 134 and data cell spray engine 136. Each output port 63 includes request handler 166, grant handler 168, data cell handler 170 and transmit logic 171. These components operate substantially identical to the description provided above with reference to F1 first stage crossbar 60. As with F2 second stage crossbar 62, the values in NextPort arrays in request spray engine 132, grant spray engine 134 and data cell spray engine 136 are initialized to the correct output port for a given destination line card and are never changed since F3 third stage crossbar 64 must switch requests, grants and data cell to particular destination line cards 66.

Unlike F1 or F2 second stage crossbars 60 or 62, the columns of counter arrays of the request handlers and the grant handlers indicate input ports 61 of F3 third stage crossbar 64, and the rows of a counter array indicate source line card 58 of the request. At output ports 63 of F3 third stage crossbar 64, only the source address is required to reconstruct requests for a given counter since the destination is fixed to one of destination line cards 66. In one implementation, the columns of counter array 174 in F3 third stage crossbar 64 are configured to represent input ports of a F3 third stage crossbar 64. In this implementation, each input port receives at most one request per cell slot and only one counter in a column can be accessed per cell slot.

Figure 24:
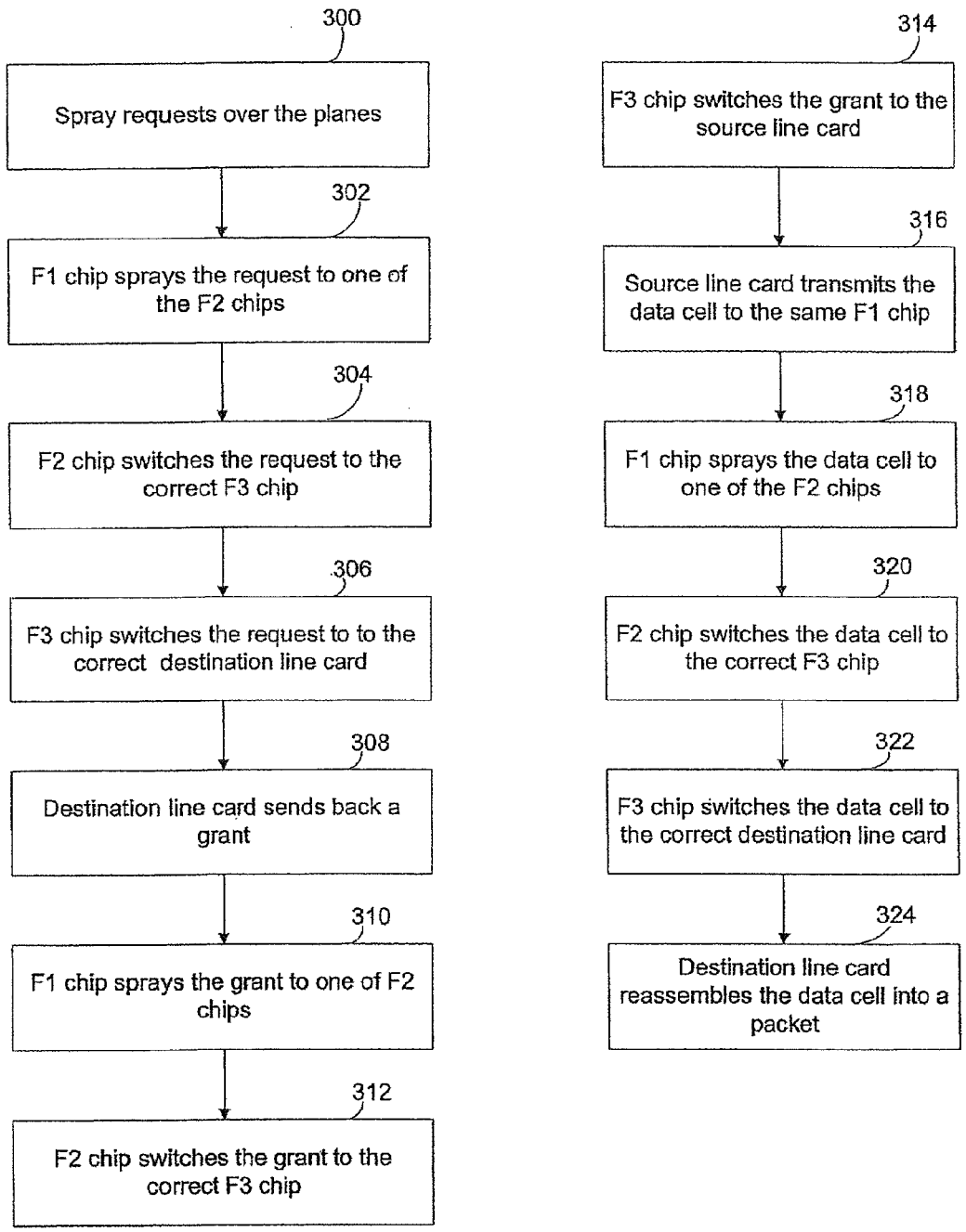
FIG. 24 is a flow diagram of a process of transmitting a request, a grant and a data cell.

Referring to FIGS. 14, 15 and 24, the data flow through a multi-plane switching fabric 54 is shown. Although data transfer units including requests, grants and data cells (which are unrelated to each other) are actually sent and received on each cell slot, the discussion below deals with the request, grant and data cell independently for clarification purposes. Source line card 58 sprays requests over each of plane 55 in the multi-plane switch fabric to distribute the load equally to all planes 55 (step 300). Each request for a given destination goes to a different plane in round-robin order. In this implementation, one grant is provided for each request and is submitted on the same plane that the request was received.

In each plane 55, F1 first stage crossbar 60 receives the request and sprays the request to one of F2 second stage crossbars 62 in the same plane (step 302). Input port 61 connected to source line card 58 receives the request and sprays the request to one of output ports 63 in F1 first stage crossbar 60. Each output port 61 is hardwired to one of F2 second stage crossbars 62 so spraying the request to a particular output port constitutes spraying the request to a corresponding F2 second stage crossbar 62. F1 first stage crossbar 60 may spray the request to any one of F2 second stage crossbars 62 regardless of the destination of the request. Software may be used to disable one or more of output ports 63 of the F1 first stage crossbar so that the request is not sent to defective F2 second stage crossbars 62. Such programming can be performed by modifying the contents of the jump table.

The selected F2 second stage crossbar 62 switches the request to the correct F3 third stage crossbar 64 according to the destination (step 304). Unlike F1 first stage crossbar 60, F2 second stage crossbar 62 must send the request to a particular F3 third stage crossbar according to the destination. For example, if the request is being sent to destination line card 66 in the first group, where each group has L number of destination line cards 66, the request must be sent to F3 third stage crossbar 64 in the first row. If the request is sent to destination line card 66 in the fifth group, the request must be sent to F3 third stage crossbar 64 in the fifth row.

F3 third stage crossbar 64 collects the request from F2 second stage crossbars 62 and switches them to the correct destination line card 66 (step 306). In one embodiment, the high-order bits of the destination address of the request specify the correct F3 third stage crossbar 64, and the low-order bits of the destination address specify the correct destination line card 66.

Destination line card 66 sends back a grant to source line card 58 for each request received (step 308). The grants are sent to the same plane from which the request arrived. Sending the grant to the same plane on which the request arrived reduces congestion in switching fabric 54 since arrival of the request indicates that bandwidth is available to send a cell on that plane.

Switching fabric 54 handles the grants the same way it handled the requests, except the grants are traveling from destination line card 66 to source line card 58. That is, F1 first stage crossbar 60 sprays the grant to one of F2 second stage crossbars 62 (step 310). F2 second stage crossbar 62 switches the grant to the correct F3 third stage crossbar 64 according to source line card 58 (step 312). F3 third stage crossbar 64 switches the grant to the correct source line card 58 (step 314).

Upon receiving the first grant, source line card 58 transmits a data cell on F1 first stage crossbar 60 in the same plane from which the first grant was received (step 316). The grants arriving subsequently from other planes 55 are used to transmit other data cells waiting to be sent out to the same destination line card. Data cells are always sent out on the same plane as the plane from which the grant was received. The time difference between request issuance and grant arrival may vary between the planes. While grants are uniformly sprayed over the planes, the congestion in each plane may vary. As described above, a grant does not identify which data cell triggered its associated request. A grant simply informs source line card 58 that it may transmit a data cell to destination line card 66 that has sent back the grant. Data cells are always sent out in a proper sequence which reduces reordering required in destination line card 66. If data cells were sent out only when the associated grant arrived, reordering of cells received at destination line card 66 would increase because grants do not necessarily arrive in order.

F1 first stage crossbar 60 sprays the data cell to one of F2 second stage crossbar 62 (step 318). F2 second stage crossbar 62 switches the data cell to the correct F3 third stage crossbar 64 according to destination line card 66 (step 320). F3 third stage crossbar 64 switches the data cell to the correct destination line card 66 (step 322). Destination line card 66 combines the data cell with other data cells received from source line card 58 to reassemble them into a packet (step 324). Reordering of the data cell may be required at destination line card 66 since the data cells may arrive out of order even though the data cells are sent in a proper sequence by source line card 58.

As can be understood from the above, F1 first stage crossbar 60 sprays the request, grant and data cell independently and may spray each of them to different F2 second stage crossbars 62, in contrast to source line card 58 which always sends them to the same F1 first stage crossbar The most common cause of contention in switching fabric 54 is a burst of requests from different sources for a single destination, in which case the requests pile up in F3 third stage crossbar 64. As a result, there can be a significant delay between the time a request travels through F2 second stage crossbar 62 and the time the corresponding grant and data cell pass through F2 second stage crossbar 62, so there is no benefit to using the same F2 second stage crossbar 62.

The present invention has been described in terms of specific embodiments, which are illustrative of the invention and not to be construed as limiting. Other embodiments are within the scope of the following claims.

Figure 25:
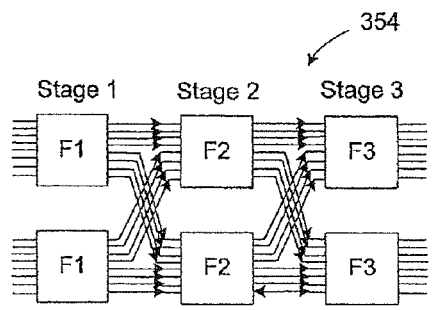
FIG. 25 is a schematic diagram of a small configuration switching fabric.

Referring to FIG. 25, the present switching system and algorithms may be used to build a smaller switching fabric 354. A minimal configuration consists of up to L number of source line cards and destination line cards connected by a fabric consisting of just one F first stage crossbar per plane. Intermediate configurations can be constructed by rearranging the links between the F first stage crossbars. The L links connected to an F first stage crossbar must be bundled into r groups, where r is the number of F first stage crossbar rows. Switching fabric 354 is a two-row system containing groups of L/2 connections linking the F first stage crossbars. This topology may be implemented by including some additional functionality in F2 second stage crossbars since cells bound for one destination must be sprayed over multiple F2 output ports to fully utilize the fabric bandwidth. In contrast, in the full switching fabric configuration described previously, the destination line card number determines a single F2 output port. The spray engines 132, 134 and 136 described above may be easily programmed to implement this modification. These and other configurations of the CLOS topology can be easily supported. Various programming modifications can be made to the jump table and next port table to support these different system configuration. In addition, an address map may be included in each F first stage crossbar for remapping source and destination addresses in order to decouple the software address and the physical address.

Figure 26:
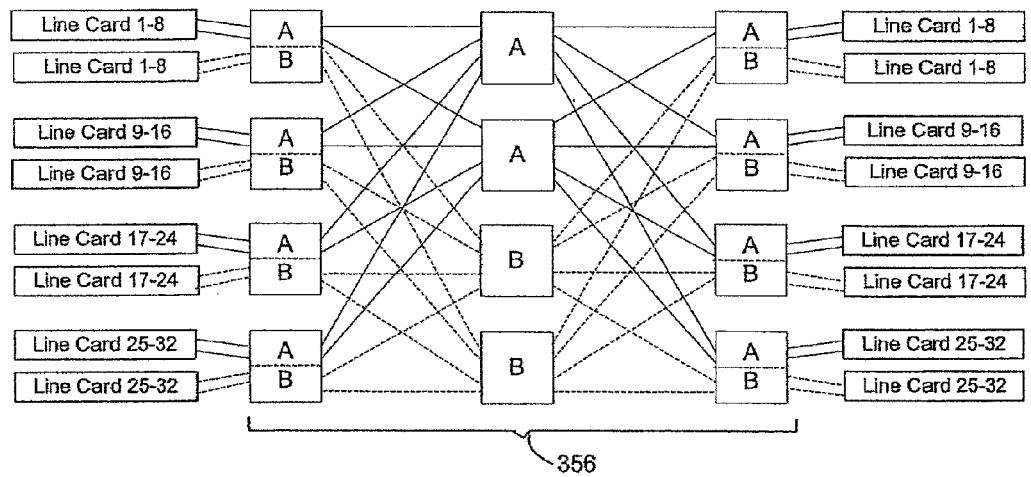
FIG. 26 is a schematic diagram of a switching fabric with virtual planes.

Referring to FIG. 26, the present switching system and algorithms may be used to build switching fabrics for different system sizes from the same switch boards and chassis, i.e., to build a switching fabric 356 with "virtual planes". A smaller system with fewer line cards can be realized by reducing the number of planes in the fabric instead of the number of F stage crossbars. "Virtual" planes can be embedded into a smaller number of physical planes. The virtual planes have a smaller number of line cards, so each line card can be connected multiple times to each physical plane, providing the required bandwidth. For example, if the initial switch fabric implementation consists of a switch fabric chassis that supports one fabric plane for a 64-line-card system, then the same chassis could be used for a two plane 32-line-card system.

Switching fabric 356 shows two planes A and B of a 32-line-card system built from one plane of a 64-line-card system. Each line card chassis connects to the switch fabric chassis via 16 links instead of the usual 8. Half of the connections (the solid ones) are part of virtual plane A and the other (the dashed ones) are part of virtual plane B. In each F1 first stage switch, the spray engines associated with the first eight input ports are programmed to spray only to the first eight output ports, and similarly for the last eight ports. This keeps traffic on virtual plane A in separate queues from traffic on virtual plane B. At the second stage, two of F2 second stage crossbars carry only traffic for plane A and the other two only carry traffic for plane B. Finally at the third stage (F3 third stage crossbars), the two planes again use distinct queues so that plane A traffic only travels through the first eight input and output ports. Similarly, plane B traffic only travels through the last eight input and output ports.

Figure 27:
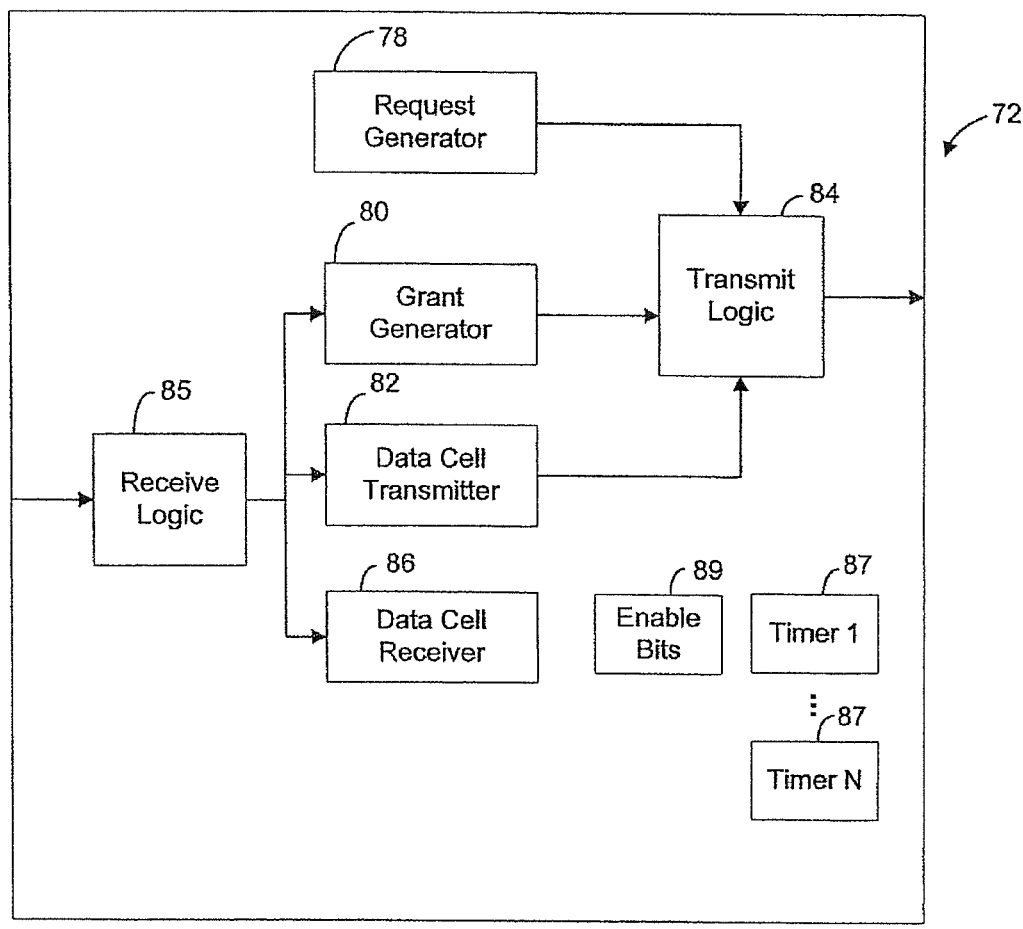
FIG. 27 is a schematic diagram of a fabric network interface system having a plurality of timers and a plane-enable bits.

Referring to FIG. 27, in one implementation fabric interface (Nf) logic 72 of each source line card 58 may include a plurality of timers 87 and plane-enable bits 89 for fault detection and recovery features. Each timer 87 can be associated with a particular plane. Timer 87 is set when a request is sent to destination line card 66 on the timer's associated plane and reset when a grant from the same destination line card arrives. If the grant does not arrive within a predetermined time, source line card 58 is alerted that there is a faulty connection on that plane. Enable bit 89 for that particular plane is turned off so that requests are no longer sent on that plane from the indicated source line card. However, other source line cards 58 may continue to send requests on the plane. In one implementation, the system includes one enable bit 89 per plane per destination line card so that each plane can be selectively disabled depending on the line cards that can be reached on the given plane.

Although individual F1, F2 and F3 third stage crossbars are described, respectively, as components in the first, second and third stage of switching fabric 54, a single generic type of F stage crossbar may be used for all three stages by modifying the operational mode of the F stage crossbar accordingly. In one embodiment, fault detection and recovery can easily be implemented. Fault detection of F stage crossbars or links can easily be determined using the request/grant protocols described herein. When grants are not received back, the spray engine in an F stage crossbar or input port can be programmed to avoid the failed links or crossbars.

What is claimed is:

1. A method performed by a switch that includes a plurality of different planes, the method comprising:
   receiving, by a first crossbar, data including destination information,
      the data being received from a source device, and
      the first crossbar being located in a first plane of the plurality of different planes,
         the first plane including a second crossbar and a third crossbar, and
         each of the plurality of different planes including:
            at least one other first crossbar,
            at least one other second crossbar, and
            at least one other third crossbar;
   transmitting, by the first crossbar, the data to the second crossbar without using the destination information;
   receiving, by the second crossbar, the data;
   transmitting, by the second crossbar and based on the destination information, the data to the third crossbar;
   receiving, by the third crossbar, the data; and
   transmitting, by the third crossbar and based on the destination information, the data toward a destination device;
   receiving, by the first crossbar, the second crossbar, and the third crossbar, grant information from the destination device; and
   transmitting, by the first crossbar, the second crossbar, and the third crossbar, the grant information to the source device,
      the grant information being transmitted to the source device using the first plane.

2. The method of claim 1, where, when transmitting the data toward the destination device, the method includes:
   determining the destination device from a plurality of destination devices; and
   transmitting the data toward the determined destination device.

3. The method of claim 1,
   where the source device is a source line card.

4. The method of claim 1, further comprising:
   transmitting, by the first crossbar and based on the grant information, a data cell toward the destination device.

5. The method of claim 1, further comprising:
   receiving, by the first crossbar, a data cell;
   transmitting, by the first crossbar, the data cell to the second crossbar;
   receiving, by the second crossbar, the data cell;
   transmitting, by the second crossbar, the data cell to the third crossbar;
   receiving, by the third crossbar, the data cell; and
   transmitting, by the third crossbar, the data cell toward the destination device.

6. The method of claim 5, where the data cell is transmitted only on the first plane.

7. The method of claim 5, where
   the first crossbar transmits the data cell without using destination information associated with the data cell,
   the second crossbar transmits the data cell using the destination information associated with the data cell, and
   the third crossbar transmits the data cell using the destination information associated with the data cell.

8. A switch fabric that includes a plurality of different planes, the switch fabric comprising:
   a first crossbar to:
      receive data including destination information,
         the data being received from a source device, and
         the first crossbar being located in a first plane of the plurality of different planes,
            the first plane including a second crossbar and a third crossbar, and
            each of the plurality of different planes including:
               at least one other first crossbar,
               at least one other second crossbar, and
               at least one other third crossbar, and
      transmit the data to the second crossbar without using the destination information;
   the second crossbar to:
      receive the data, and
      transmit, based on the destination information, the data to the third crossbar; and
   the third crossbar to:
      receive the data; and
      transmit, based on the destination information, the data toward a destination device,
   the first crossbar, the second crossbar, and the third crossbar being further to:
      receive grant information from the destination device; and
      transmit the grant information to the source device,
         the grant information being transmitted to the source device using the first plane.

9. The switch fabric of claim 8, where the third crossbar, when transmitting the data toward the destination device, is further to:
    determine the destination device from a plurality of destination devices; and
    transmit the data toward the determined destination device.

10. The switch fabric of claim 8, where the source device is a source line card.

11. The switch fabric of claim 8, where the first crossbar is further to:
    transmit, based on the grant information, a data cell toward the destination device.

12. The switch fabric of claim 8, where
    the first crossbar is further to:
        receive a data cell, and
        transmit the data cell to the second crossbar;
    the second crossbar is further to:
        receive the data cell, and
        transmit the data cell to the third crossbar; and
    the third crossbar is further to:
        receive the data cell, and
        transmit the data cell toward the destination device.

13. The switch fabric of claim 12, where the data cell is transmitted only on the first plane.

14. The switch fabric of claim 12, where
    the first crossbar transmits the data cell without using destination information associated with the data cell,
    the second crossbar transmits the data cell using the destination information associated with the data cell, and
    the third crossbar transmits the data cell using the destination information associated with the data cell.

15. A non-transitory computer-readable medium storing instructions, the instructions comprising:
    a plurality of instructions which, when executed by a network device that includes a plurality of different planes, cause the network device to:
        receive, by a first crossbar of a plurality of first crossbars, data including destination information,
            the data being received from a source device, and
            the first crossbar being located in a first plane of the plurality of different planes,
                the first plane including a second crossbar and a third crossbar, and
                each of the plurality of different planes including:
                    at least one other first crossbar,
                    at least one other second crossbar, and
                    at least one other third crossbar;
        transmit, by the first crossbar, the data to the second crossbar without using the destination information;
        receive, by the second crossbar, the data;
        transmit, by the second crossbar and based on the destination information, the data to the third crossbar;
        receive, by the third crossbar, the data;
        transmit, by the third crossbar and based on the destination information, the data toward a destination;
        receive, by the first crossbar, the second crossbar, and the third crossbar, grant information from the destination device; and
        transmit, by the first crossbar, the second crossbar, and the third crossbar, the grant information to the source device,
            the grant information being transmitted to the source device using the first plane.

16. The medium of claim 15, where the instructions to transmit the data toward the destination device include:
    one or more instructions to determine the destination device from a plurality of destination devices; and
    one or more instructions to transmit the data toward the determined destination device.

17. The medium of claim 15, where the
    source device is a source line card.

18. The medium of claim 15, where the instructions further include:
    one or more instructions to transmit, based on the grant information data cell toward the destination device.

19. The medium of claim 15, where the instructions further include:
    one or more instructions to receive, via the first crossbar, a data cell;
    one or more instructions to transmit, via the first crossbar, the data cell to the second crossbar;
    one or more instructions to receive, via the second crossbar, the data cell;
    one or more instructions to transmit, via the second crossbar, the data cell to the third crossbar;
    one or more instructions to receive, via the third crossbar, the data cell; and
    one or more instructions to transmit, via the third crossbar, the data cell toward the destination device.

20. The medium of claim 19, where the data cell is transmitted only on the first plane.

* * * * *